United States Patent
Fujiwara et al.

(10) Patent No.: US 9,908,311 B2
(45) Date of Patent: Mar. 6, 2018

(54) WATER-REPELLENT, THERMOPLASTIC RESIN SHEET, AND MOLDED ARTICLE

(71) Applicant: DENKA COMPANY LIMITED, Chuo-ku (JP)

(72) Inventors: Junpei Fujiwara, Isesaki (JP); Atsushi Takei, Isesaki (JP); Tomohiro Osawa, Isesaki (JP)

(73) Assignee: DENKA COMPANY LIMITED, Chuo-ku (JP)

( * ) Notice: Subject to any disclaimer, the term of this patent is extended or adjusted under 35 U.S.C. 154(b) by 126 days.

(21) Appl. No.: 14/650,131

(22) PCT Filed: Jul. 18, 2013

(86) PCT No.: PCT/JP2013/069550
§ 371 (c)(1),
(2) Date: Jun. 5, 2015

(87) PCT Pub. No.: WO2014/087696
PCT Pub. Date: Jun. 12, 2014

(65) Prior Publication Data
US 2015/0306852 A1    Oct. 29, 2015

(30) Foreign Application Priority Data

Dec. 7, 2012   (JP) ................................ 2012-268285

(51) Int. Cl.
*F16L 11/04*    (2006.01)
*B32B 27/08*    (2006.01)
(Continued)

(52) U.S. Cl.
CPC ................ *B32B 27/08* (2013.01); *B32B 1/02* (2013.01); *B32B 3/30* (2013.01); *B32B 27/18* (2013.01);
(Continued)

(58) Field of Classification Search
CPC .............. B32B 7/02; B32B 3/30; B32B 25/08
(Continued)

(56) References Cited

U.S. PATENT DOCUMENTS

| | | | |
|---|---|---|---|
| 6,503,588 B1 * | 1/2003 | Hayashi | B32B 27/30 |
| | | | 428/215 |
| 2006/0292323 A1 * | 12/2006 | Hutchinson | B05D 7/02 |
| | | | 428/36.91 |

(Continued)

FOREIGN PATENT DOCUMENTS

| CN | 102365164 A | 2/2012 |
|---|---|---|
| JP | 11-058619 A | 3/1999 |

(Continued)

OTHER PUBLICATIONS

Extended European Search Report dated Apr. 25, 2016 in Patent Application No. 13861034.0.

(Continued)

*Primary Examiner* — Ellen S Wood
(74) *Attorney, Agent, or Firm* — Oblon, McClelland, Maier & Neustadt, L.L.P.

(57) ABSTRACT

Provided is a water-repellent, thermoplastic resin sheet including a textured layer which is formed from a polyethylene resin composition comprising a water repellent agent and which has a microscopic texture on one surface side, wherein at least the surface region of the textured layer is a cross-linked material which maintains the microscopic texture even after heated drawing. Also provided is a molded article, such as a molded container, formed by thermoforming the thermoplastic resin sheet.

16 Claims, 3 Drawing Sheets

(51) Int. Cl.
- *B32B 27/18* (2006.01)
- *B32B 27/32* (2006.01)
- *C08F 110/02* (2006.01)
- *C09K 3/18* (2006.01)
- *B32B 1/02* (2006.01)
- *B32B 3/30* (2006.01)

(52) U.S. Cl.
CPC ............ *B32B 27/32* (2013.01); *C08F 110/02* (2013.01); *C09K 3/18* (2013.01); *B32B 2307/7244* (2013.01); *B32B 2307/73* (2013.01); *B32B 2439/70* (2013.01)

(58) Field of Classification Search
USPC ........................................ 428/141, 35.7, 35.6
See application file for complete search history.

(56) References Cited

U.S. PATENT DOCUMENTS

| | | | |
|---|---|---|---|
| 2012/0003427 A1* | 1/2012 | Kuroda | B32B 7/02 428/141 |
| 2012/0118886 A1* | 5/2012 | Sekiguchi | B32B 27/06 220/200 |
| 2012/0121858 A1 | 5/2012 | Kato | |

FOREIGN PATENT DOCUMENTS

| | | |
|---|---|---|
| JP | 2000-204210 A | 7/2000 |
| JP | 2003-1736 A | 1/2003 |
| JP | 2006-021409 A | 1/2006 |
| JP | 2010 184454 | 8/2010 |
| JP | 2010-188584 | 9/2010 |
| JP | 2010-254377 A | 11/2010 |
| JP | 2012-17117 A | 1/2012 |
| JP | 4878650 B1 | 2/2012 |
| JP | 2012-41049 A | 3/2012 |
| JP | 2013-71779 A | 4/2013 |
| WO | 2010/137542 A1 | 12/2010 |

OTHER PUBLICATIONS

Extended European Search Report dated May 4, 2016 in Patent Application No. 13860589.4.
U.S. Appl. No. 14/649,783, filed Jun. 4, 2015, Fujiwara, et al.
International Search Report dated Oct. 22, 2013 in PCT/JP2013/069550 filed Jul. 18, 2013.
Office Action dated Jul. 3, 2017, in co-pending U.S. Appl. No. 14/649,783.
International Search Report dated Oct. 22, 2013 in PCT/JP2013/069549 filed Jul. 18, 2013.
Office Action dated Mar. 13, 2017, in co-pending U.S. Appl. No. 14/649,783.

* cited by examiner

[FIG. 1]
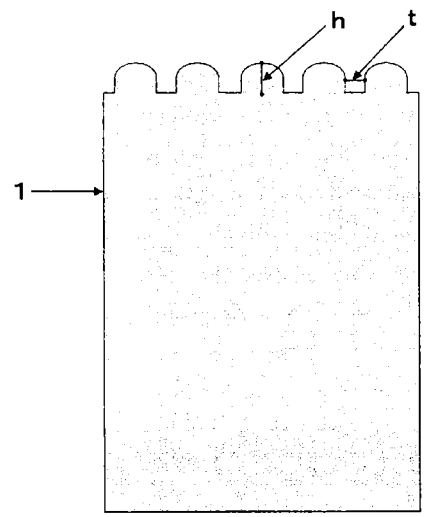
[FIG. 2]
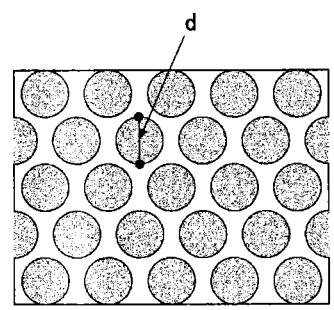
[FIG. 3]
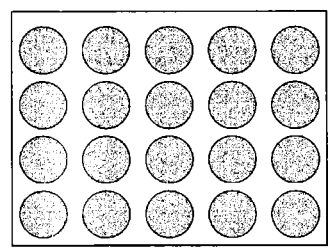

[FIG. 4]
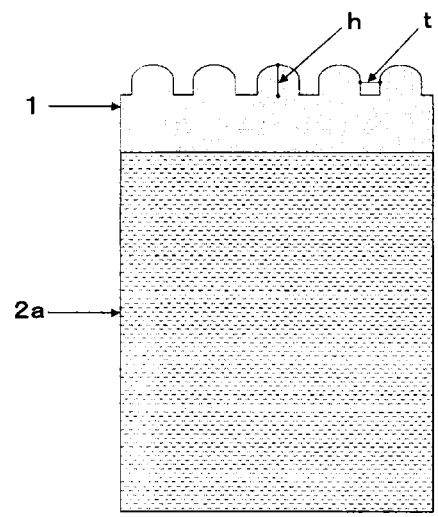
[FIG. 5]
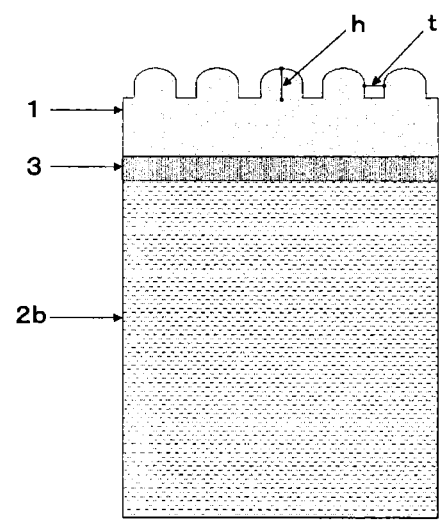

[FIG. 6]
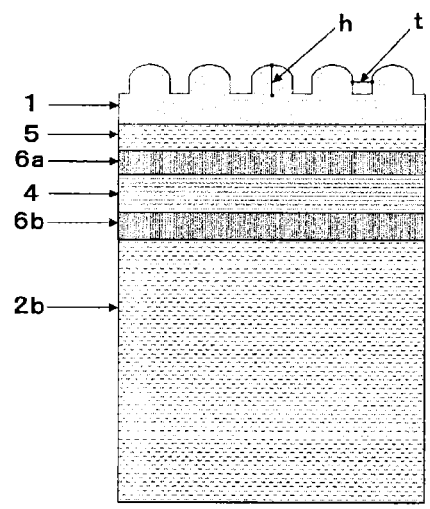
[FIG. 7]
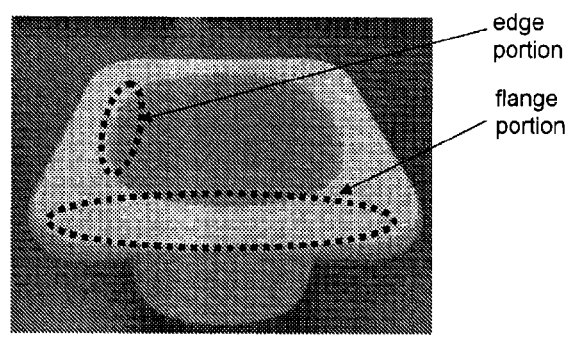
[FIG. 8]
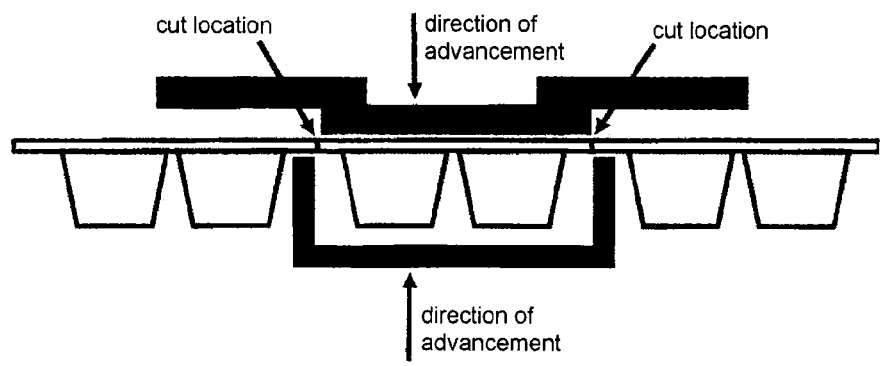

WATER-REPELLENT, THERMOPLASTIC RESIN SHEET, AND MOLDED ARTICLE

TECHNICAL FIELD

The present invention relates to a thermoplastic resin sheet having a water repellent property, and a molded article molded therefrom.

BACKGROUND ART

Conventionally, styrenic resins, which excel in thermoforming capability and rigidity, have been used for containers of soft drinks, juices, specialty beverages/foods and the like. For example, Patent Document 1 proposes a styrenic resin sheet for such containers. On the other hand, in recent years, such containers have increasingly been produced in a series of steps including molding, filling of content and sealing of the lid. For example, Patent Document 2 proposes a multilayer resin sheet wherein a polystyrene resin layer and a polyolefin resin layer are laminated, preventing the generation of resin whiskers while punching in the process leading to the final product.

Additionally, multilayer resin sheets that are endowed with an oxygen barrier property by using a styrenic resin layer as the outermost layer and providing an ethylene-vinyl alcohol copolymer resin layer with an adhesive layer of a modified olefinic resin or the like interposed therebetween, thereby preventing loss of quality due to oxidation of the contents, and multilayer containers consisting thereof, have become common (Patent Document 3).

On the other hand, packaging materials for packaging contents such as food products have had problems in that the contents could adhere to the packaging material. The multilayer resin sheets formed by laminating a polystyrenic resin layer and a polyolefinic resin layer described above also have the problem of adhesion of food products to packaging materials such as containers using such sheets. Particularly in the case of containers for yogurt, the yogurt can often stick to the top edge portions of the container and splatter when the container is opened.

Patent Document 1: JP 2000-204210 A
Patent Document 2: JP 2006-21409 A
Patent Document 3: JP H11-58619 A

SUMMARY OF THE INVENTION

The present invention was made in view of the above-described circumstances, and in the principal embodiment of the present invention, has the object of offering a resin sheet with little risk of food products adhering when used as a packaging material for food products, and a molded article molded from said resin sheet.

Another embodiment of the present invention has the object of offering a resin sheet that excels in thermoforming capability in addition to having excellent food product adhesion resistance, a resin sheet further excelling in an oxygen barrier property, and molded articles molded from said resin sheets.

In other words, the present inventors recognized that adhesion of food products could be prevented by providing water repellence, and upon studying various means for achieving water repellence, discovered that a sheet surface could be provided with high water repellence enabling prevention of food product adhesion by giving the sheet surface a microscopic texture and adding a water repelling agent, and that the high water repellence could be maintained by crosslinking the resin to preserve the microscopic texture even after heated drawing of the sheet.

Therefore, according to a principal embodiment, the present invention offers a thermoplastic resin sheet having water repellence, comprising a textured layer formed from a polyethylene resin composition comprising a water repellent agent, having a microscopic texture on one surface side, wherein at least a surface portion of the texture is a crosslinked material that maintains the microscopic texture even after heated drawing. Since this thermoplastic resin sheet is provided with a textured layer comprising a water repellent agent having a texture that maintains the microscopic texture even after heated drawing, the microscopic texture and the water repellence of the water repellent agent together achieve exceptional water repellence, thereby solving the problem of adhesion of food products when used as a material for packaging food products.

Additionally, according to other embodiments, the present invention offers a thermoplastic resin sheet wherein a styrenic resin layer is laminated on the other surface of the textured layer, and a thermoplastic resin sheet wherein a sealant resin layer is further formed between the textured layer and the styrenic resin layer. This thermoplastic resin sheet has excellent food product adhesion preventing ability, as well as excelling in thermoforming capability and rigidity.

Furthermore, according to another embodiment, the present invention offers a thermoplastic resin sheet wherein, on the other surface side of the textured layer, an oxygen barrier resin layer is laminated with one surface on the textured layer side such that, sequentially from the textured layer side, a sealant resin layer and a modified olefinic polymer resin layer are interposed therebetween, and on the other surface of the oxygen barrier resin layer, a styrenic resin layer is laminated such that a modified olefinic polymer resin layer is interposed therebetween. This resin sheet also excels in oxygen barrier properties.

In addition to the above, in a preferable embodiment, the water repellent agent is a silicone-based water repellent agent and/or carnauba wax. The silicone-based water repellent agent preferably consists of a composition comprising a silicone resin and an olefinic resin and a higher fatty acid amide, wherein the silicone resin content is, for example, 2-10 mass % with respect to the total mass of the resin constituting the textured layer. When using carnauba wax, the amount should be, for example, 3-10 mass % with respect to the total mass of the resin constituting the textured layer.

Additionally, in a preferred embodiment, at least a surface portion of the texture can be an electron beam-crosslinked material, and by irradiating the one surface of the textured layer with an electron beam, at least a surface portion of the textured layer, preferably the entirety of the textured layer, can be crosslinked to form a crosslinked material. The electron beam irradiation conditions are preferably an acceleration voltage of 110 to 250 kV and a radiation dose of 150 to 300 kGy. The texture, in one embodiment, has bumps that are bell-shaped, with bump heights of 70 μm to 200 μm, bump diameters of 80 μm to 500 μm, and a bump pitch of 15 μm to 70 μm. Additionally, in a preferred embodiment, the thermoplastic multilayered resin sheet has a drawing ratio for heated drawing of 0.05 to 2.5 times, and a rate of decrease of bump height of the textured layer before and after heated drawing of 30% or less.

Furthermore, in one embodiment, the styrenic resin layer is formed from a composition comprising, as a resin component, 10 to 50 mass % of a polystyrene resin and 90 to 50 mass % of a high-impact polystyrene resin, and further comprising 4.5 to 8.1 parts by mass of a rubber component with respect to 100 parts by mass of the resin component. Additionally, the sealant resin layer is preferably formed from a resin composition comprising 90 to 95 mass % of a high-impact polystyrene resin and 5 to 10 mass % of a hydrogenated styrenic thermoplastic elastomer, or 100 mass % of a hydrogenated styrenic thermoplastic elastomer, or 100 mass % of a modified olefinic polymer resin. Furthermore, the oxygen barrier resin layer preferably consists of an ethylene-vinyl alcohol copolymer resin.

According to another embodiment, the present invention offers a molded article formed by thermoforming the thermoplastic resin sheet of the present invention. The molded article is preferably a molded container, the molded container is preferably a container for food products, and the container for food products, in one example, is a yogurt container. The molded container according to the present invention particularly excels in water repellence, and is therefore suited for use as a molded container for which adhesion of food products is a problem.

BRIEF DESCRIPTION OF THE DRAWINGS

FIG. 1 A schematic vertical section view showing the structure of a thermoplastic resin sheet according to a first embodiment of the present invention.

FIG. 2 A schematic plan view of the resin sheet of FIG. 1, showing a staggered arrangement of bumps in the textured layer.

FIG. 3 A view similar to that of FIG. 2, showing a grid arrangement of bumps in the textured layer.

FIG. 4 A schematic vertical section view of a layer structure of a thermoplastic resin sheet according to a second embodiment of the present invention.

FIG. 5 A schematic vertical section view of a layer structure of a thermoplastic resin sheet according to a third embodiment of the present invention.

FIG. 6 A schematic vertical section view of a layer structure of a thermoplastic resin sheet according to a fourth embodiment of the present invention.

FIG. 7 A photograph of an example of a molded container of the present invention.

FIG. 8 A schematic view for explaining a punching process of the container.

MODES FOR CARRYING OUT THE INVENTION

While the thermoplastic resin sheet according to the present invention essentially comprises a textured layer formed from a polyethylene resin composition comprising a water repellent agent, having a microscopic texture on one surface side, wherein at least a surface portion of the texture is a crosslinked material that maintains the microscopic texture even after heated drawing, various embodiments are possible depending on whether or not a laminated structure including other layers is used, and when including other layers, what kinds of layers they are. Herebelow, various embodiments of the thermoplastic resin sheet will be explained, and the production of thermoplastic resin sheets and molded containers will be explained, but when a specific description of one embodiment applies to another embodiment, then the explanation will be omitted in the other embodiment.

First Embodiment

The thermoplastic resin sheet according to a first embodiment of the present invention, as shown in FIG. 1, is a sheet having water repellence formed from a polyethylene resin composition comprising a water repellent agent, having a microscopic texture on one surface side, wherein at least a surface portion of the texture is a crosslinked material that maintains the microscopic texture even after heated drawing. The thermoplastic resin sheet according to the present embodiment is a single-layered sheet having a texture formed thereon, wherein the layer thickness including the texture is equal to the sheet thickness to be described below.

While the thermoplastic resin sheet according to the present invention has a textured layer that "maintains the microscopic texture even after heated drawing", this merely defines that the thermoplastic resin sheet according to the present invention has the property of the sheet being able to maintain a microscopic texture even after heated drawing, and does not mean that the sheet must necessarily undergo heated drawing. Therefore, the thermoplastic resin sheet according to the present invention includes non-drawn sheets in addition to drawn sheets, but is preferably a drawn sheet.

Additionally, the "drawing" mentioned here, in addition to cases in which a sheet is drawn to form a wide sheet, includes cases in which the sheet is drawn when forming a container by molding sheets, especially during molding of corner portions of the container.

Furthermore, in the present invention, the "water repellence" of the resin sheet having water repellence refers to water repellence of a level sufficient to prevent adhesion of food products to the resin sheet, and specifically refers to the case wherein the contact angle of a liquid on the resin sheet is at least 100°.

<Textured Layer (1)>

The textured layer is provided in order to achieve water repellence by means of a microscopic surface texture, and is a resin sheet formed from a polyethylene resin composition comprising a water repellent agent, having a microscopic texture on the face that is to be the sheet surface.

Here, "polyethylene resin composition" refers to a composition of which the main component is a polyethylene resin, for example, containing a polyethylene resin in an amount of at least 50 mass % with respect to the total mass of the composition, preferably at least 80 mass %, more preferably at least 90 mass %, even more preferably at least 95 mass %, and most preferably 100 mass % (in other words, the entire amount). The resin components other than the polyethylene resin contained in the polyethylene resin composition may be any thermoplastic resin as long as they can be used in packaging materials for food products, and do not adversely affect transferability (texture formability) by hot transfer methods and the like for providing a texture on the sheet surface, or the crosslinking ability by electron beams and the like to be described below, but olefin resins are preferred.

Additionally, "polyethylene resin" refers to polymers of which the main component of the monomers is ethylene, where "main component" means at least 50 mass % of the total amount of monomers, preferably at least 70 mass %, more preferably at least 80 mass %, and even more preferably at least 90 mass %, and of course the entire amount may be ethylene. Therefore, examples of polyethylene resins include high-density polyethylene, low-density polyethylene, linear low-density polyethylene and linear medium-density polyethylene, as well as copolymers, grafts and blends having such structures. The latter resins include, for example, copolymers and blends of resins having polar groups in the polyethylene chain such as ethylene-vinyl acetate copolymers, ethylene-acrylic acid copolymers, ethylene-acrylic acid ester copolymers, ethylene-methacrylic acid ester copolymers, ethylene-vinyl acetate-vinyl chloride copolymers, and further blends with ternary copolymers or the like with acid anhydrides.

The polyethylene resin compositions, in view of the above-mentioned formability of the texture on the sheet surface and crosslinking ability using electron beams, preferably contain linear low-density polyethylenes and linear medium-density polyethylenes, and more preferably, consist thereof.

While linear low-density polyethylenes and linear medium-density polyethylenes include those polymerized by Ziegler-type catalysts (t-LLDPEs) and those polymerized by metallocene catalysts (m-LLDPEs), the m-LLDPEs are preferably copolymer resins having, as comonomers, ethylenes and olefins with at least three carbon atoms, preferably linear, branched or aromatic nucleus-substituted α-olefins having 3 to 18 carbon atoms. Examples of linear monoolefins include propylene, 1-butene, 1-pentene, 1-hexene, 1-octene, 1-nonene, 1-decene, 1-dodecene, 1-tetradecene, 1-hexadecene and 1-octadecene. Additionally, examples of branched monoolefins include 3-methyl-1-butene, 3-methyl-1-pentene, 4-methyl-1-pentene and 2-ethyl-1-hexene. Additionally, examples of monoolefins substituted with an aromatic nucleus include styrenes and the like. These comonomers can be copolymerized with ethylenes either as a single type or in combinations of two or more types. This copolymerization may involve copolymerization of a polyene such as butadiene, isoprene, 1,4-hexadiene, dicyclopentadiene or 5-ethylidene-2-norbornene. The α-olefin content in this copolymer resin is generally 1 to 20 mol %.

The water repellent agent, in one embodiment, is a silicone-based water repellent agent, preferably consisting of a composition comprising a silicone resin and a higher fatty acid amide in a base resin, the silicone resin preferably comprising a low molecular weight silicone resin with a molecular weight of 1000 to 50,000 and a high molecular weight silicone resin with a molecular weight of 200,000 to 1,000,000. The base resin may be of any type that has conventionally been used as a mold material for resin molded articles, examples of which include various types of polyolefinic resins such as low-density polyethylenes, high-density polyethylenes and polypropylenes. Additionally, examples of silicone resins include organopolysiloxanes, dimethyl polysiloxane, methylphenyl polysiloxane and methylhydrogen polysiloxane, among which dimethyl polysiloxane is preferably used. Additionally, the higher fatty acid amide has the function of achieving excellent contamination resistance in conjunction with the silicone resin, examples of which include saturated fatty acid amides (such as stearic acid amide and behenic acid amide), unsaturated fatty acid amides (such as oleic acid amide and erucic acid amide), saturated fatty acid bis-amides (such as ethylene bis-stearic acid amide) and unsaturated fatty acid bis-amides (such as ethylene bis-oleic acid amide, hexamethylene bis-oleic acid amide and N,N'-dioleyl sebacic acid amide), which may be used singly, or as combinations of two or more types. Among these, oleic acid amide, which is an unsaturated fatty acid amide, is preferred.

In the aforementioned silicone-based water repellent agent, the silicone resin content (the total amount of the high molecular weight silicone resin and the low molecular weight silicone resin) with respect to the total mass of the resins constituting the textured layer, in other words, with respect to the total mass of the polyethylene resin composition and the silicone-based water repellent agent, is 2 to 10 mass %. By setting the composition within this range, a textured layer satisfying formability (transferability) of the texture in a heated transfer method or the like for providing a microscopic texture on the sheet surface, crosslinking ability and water repellence can be obtained. At less than 2 mass %, sufficient water repellence may not be able to be obtained, and at more than 10 mass %, there may be deficiencies in the appearance when producing a sheet.

In another embodiment, the water repellent agent is carnauba wax, the content of which is 3 to 10 mass % with respect to the total mass of the resins constituting the textured layer. By setting the composition within this range, a textured layer satisfying formability (transferability) of the texture by a heated transfer method or the like for providing a microscopic texture on the sheet surface, crosslinking ability and water repellence can be obtained. At less than 3 mass %, sufficient water repellence may not be able to be obtained, and at more than 10 mass %, there may be deficiencies in the appearance when producing a sheet.

While the texture is provided to confer water repellence to the sheet and refers to a microscopic texture that is contoured to confer water repellence to the sheet, it may be in any form. For example, the raised portions of the texture may consist of pyramidal shapes such as triangular pyramids, square pyramids, hexagonal pyramids, octagonal pyramids or cones, or truncated pyramids or truncated cones, but upon studying various possibilities thereof, the present inventors discovered that bell-shaped bumps are particularly preferable. Additionally, they found that bumps with a height h of 70 μm to 200 μm, a diameter d of 80 μm to 500 μm, and a pitch t of 15 μm to 70 μm are preferable. Even outside these ranges, excellent water repellence can be obtained compared to the case in which a texture is absent, but setting the texture to be within this range enables the texture to be adequately maintained even after thermoforming, so that the water repellence can be kept high. In contrast, if the bump height is less than 70 μm, sufficient water repellence may not be able to be retained after thermoforming, whereas if the bump height exceeds 200 μm, the dimensions of the texture formed by a mold for providing the texture can be unstable. If the bump diameter is less than 80 μm, the dimensions of the texture formed by a mold for providing the texture can be unstable, and if the bump diameter exceeds 500 μm, the appearance of the textured surface after thermoforming may be unattractive. Additionally, if the bump pitch is less than 15 μm, the texture dimensions on the mold used for providing the texture may become unstable, and if the bump pitch exceeds 70 μm, sufficient water repellence may not be able to be maintained after thermoforming.

The arrangement of bumps is not particularly limited, and they may be in a staggered arrangement as shown in FIG. 2, or in a grid arrangement positioned in rows and columns as shown in FIG. 3. A staggered arrangement is preferred in order to maintain better water repellence after thermoforming.

Second Embodiment

The thermoplastic resin sheet according to a second embodiment of the present invention, as shown in FIG. 4, is a sheet having water repellence, comprising a textured layer (1) formed from a polyethylene resin composition comprising a water repellent agent and having a microscopic texture on one surface side, and a styrenic resin layer (2a) (substrate layer) laminated directly on the other surface side of the textured layer (1), wherein at least a surface portion on the one surface side of the textured layer (1) is a crosslinked material maintaining its microscopic texture even after heated drawing. In other words, the layer structure of the thermoplastic resin sheet according to the second embodiment is a two-layered structure consisting of textured layer (1)/styrenic resin layer (2*a*), having a layer structure with the styrenic resin layer added to the thermoplastic resin sheet according to the first embodiment. Here, the textured layer is the same as that in the first embodiment, so its explanation will be omitted. However, the thickness of the textured layer is preferably 80 to 250 μm. If less than 80 μm, the textured layer can rupture when stretched after thermoforming, which may expose the styrenic resin layer. Additionally, if 250 μm is exceeded, then the production cost of the container may become too high. On the other hand, the styrenic resin layer according to the present embodiment preferably has good adhesion with respect to the textured layer, and for this reason, should preferably be formed using a resin composition to which a hydrogenated styrenic thermoplastic elastomer has been added.

<Styrenic Resin Layer (2*a*): Substrate Layer>

Examples of the styrenic resin used for the styrenic resin layer to form the substrate layer include homo- or copolymers of styrenic monomers such as styrene, α-methylstyrene, p-methylstyrene, dimethylstyrene, p-t-butylstyrene and chlorostyrene, copolymers of said styrenic monomers with other monomers, such as styrene-acrylonitrile copolymers (AS resins), or graft polymers obtained by graft polymerization of said styrenic monomers with other polymers in the presence of dienic rubber polymers such as polybutadiene, styrene-butadiene copolymers, polyisoprene and polychloroprene, such as high-impact polystyrene (HIPS resins) and styrene-acrylonitride graft polymers (ABS resins).

Of these, polystyrene (GPPS resins) and high-impact polystyrene (HIPS resins) are preferable in view of rigidity and moldability of the molded container.

The styrenic resin layer preferably comprises 4.5 to 8.1 mass % of a butadiene rubber component. While a convenient method is to adjust the butadiene rubber component content by the blend of GPPS and HIPS, it could also be adjusted during the HIPS production stage. If less than 4.5 mass %, then the container strength may not be sufficient for practical use, and if more than 8.1 mass %, this may cause problems such as adhesion of the heating platen during thermoforming.

As mentioned above, a hydrogenated styrenic thermoplastic elastomer is added to the styrenic resin. Examples of the "hydrogenated styrenic thermoplastic elastomer" include hydrogenated copolymers of styrenic monomers and butadiene or isoprene, hydrogenated styrene-butadiene-styrene block copolymers (styrene-ethylene butylene-styrene block copolymers) and hydrogenated styrene-isoprene-styrene block copolymers (styrene-ethylene propylene-styrene block copolymers), of which styrene-ethylene butylene-styrene block copolymers are particularly preferred. Specifically, Dynaron 8601P of JSR and Tuftec P2000 and H1041 of Asahi Kasei are preferably used, and the component ratio of styrene to ethylene/butylene is preferably in the range of 12/88 to 67/33.

Furthermore, additives may be added to the styrenic resin layer as needed within a range not interfering with the effects of the present invention, including colorants such as pigments and dyes, mold release agents such as silicone oils and alkyl esters, fiber reinforcing agents such as glass fibers, particulate lubricants such as talc, clay and silica, antistatic agents such as salt compounds of sulfonic acid and alkali metals and polyalkylene glycol, UV absorbing agents, and antimicrobial agents. Additionally, scrap resins generated during the production process of the multilayered resin sheet of molded article of the present invention may be mixed and used.

Therefore, in the thermoplastic resin sheet according to the second embodiment, the styrenic resin layer used as a substrate layer is preferably an elastomer-containing styrenic resin composition further comprising 5 to 10 parts by mass of a hydrogenated styrenic thermoplastic elastomer with respect to 100 parts by mass of a styrenic resin layer comprising 50 to 10 mass % (more preferably 55 to 15 mass %) of a polystyrene resin and 50 to 90 mass % (more preferably 45 to 85 mass %) of a high-impact polystyrene resin. If the amount of the hydrogenated styrenic thermoplastic elastomer is less than 5 parts by mass, the interlayer adhesion may be insufficient and interlayer separation may occur, and if it exceeds 10 parts by mass, resin whiskers may be generated when punching out the thermoformed container.

Instead of the hydrogenated styrenic thermoplastic elastomer, another resin may be added, for example, a modified olefinic polymer resin.

Third Embodiment

The thermoplastic resin sheet according to a second embodiment of the present invention, as shown in FIG. 5, is a sheet having water repellence, comprising a textured layer (1) formed from a polyethylene resin composition comprising a water repellent agent and having a microscopic texture on one surface side, and a styrenic resin layer (2*b*) (substrate layer) laminated on the other surface side of the textured layer (1) with a sealant resin layer (3) interposed therebetween, wherein at least a surface portion on the one surface side of the textured layer (1) is a crosslinked material maintaining its microscopic texture even after heated drawing. In other words, the layer structure of the thermoplastic resin sheet according to the second embodiment consists, from top to bottom, of textured layer (1)/sealant resin layer (3)/styrenic resin layer (2*b*). Here, the textured layer is the same as that explained in the first embodiment, so its explanation will be omitted. However, the thickness of the textured layer is preferably 80 to 250 μm. If less than 80 μm, the textured layer can rupture when stretched after thermoforming, which may expose the sealant resin layer (3). Additionally, if 250 μm is exceeded, then the production cost of the container may become too high.

<Sealant Resin Layer (3)>

The sealant resin layer achieves adhesion between the textured layer and the styrenic resin layer (substrate layer). The resin component may be a resin comprising 90 to 95 mass % of a high-impact polystyrene resin and 5 to 10 mass % of a hydrogenated styrenic thermoplastic elastomer, 100 mass % of a hydrogenated styrenic thermoplastic elastomer, or 100 mass % of a modified olefinic polymer resin.

Examples of the "styrenic resin" include homo- or copolymers of styrenic monomers such as styrene, α-methylstyrene, p-methylstyrene, dimethylstyrene, p-t-butylstyrene and chlorostyrene, copolymers of said styrenic monomers with other monomers, such as styrene-acrylonitrile copolymers (AS resins), or graft polymers obtained by graft polymerization of said styrenic monomers with other polymers in the presence of dienic rubber polymers such as polybutadiene, styrene-butadiene copolymers, polyisoprene and polychloroprene, such as high-impact polystyrene (HIPS resins) and styrene-acrylonitrile graft polymers (ABS resins).

Of these, high-impact polystyrene (HIPS resins) are preferable in view of the rigidity and moldabililty of the molded container.

Examples of the "hydrogenated styrenic thermoplastic elastomer" include hydrogenated copolymers of styrenic monomers and butadiene or isoprene, hydrogenated styrene-butadiene-styrene block copolymers (styrene-ethylene butylene-styrene block copolymers) and hydrogenated styrene-isoprene-styrene block copolymers (styrene-ethylene propylene-styrene block copolymers), of which styrene-ethylene butylene-styrene block copolymers are particularly preferred. Specifically, Dynaron 8601P of JSR and Tuftec P2000 and H1041 of Asahi Kasei are preferably used, and the component ratio of styrene to ethylene/butylene is preferably in the range of 12/88 to 67/33.

Representative examples of the "modified olefinic polymer resin" include olefinic resins such as polymers of a single olefin having 2 to 8 carbon atoms, such as ethylene, propylene and butene-1, and copolymers of said olefins with other olefins having 2 to 20 carbon atoms such as ethylene, propylene, butene-1, 3-methylbutene-1, pentene-1, 4-methylpentene-1, hexene-1, octene-1 and decene-1, or with vinyl compounds such as vinyl acetate, vinyl chloride, acrylic acid, methacrylic acid, acrylic acid esters, methacrylic acid esters and styrenes, or olefinic rubbers such as ethylene-propylene copolymers, ethylene-propylene-diene copolymers, ethylene-butene-1 copolymers and propylene-butene-1 copolymers, modified under graft reaction conditions with unsaturated carboxylic acids such as acrylic acid, methacrylic acid, crotonic acid, isocrotonic acid, maleic acid, fumaric acid, ithaconic acid, citraconic acid and tetrahydrophthalic acid, or derivatives such as acid halides, amides, imides, anhydrides and esters thereof, specifically malenyl chloride, maleimide, maleic acid anhydride, citroconic acid anhydride, monomethyl maleate, dimethyl maleate and glycidyl maleate.

Of these, ethylenic resins, propylenic resins, or ethylene-propylene or butene-1 copolymer rubbers modified with unsaturated dicarboxylic acids or anhydrides thereof, particularly maleic acid or anhydrides thereof, are preferred.

The thickness of the sealant resin layer should preferably be 20 to 90 μm, more preferably 30 to 70 μm. If less than 20 μm, interlayer separation may occur between the textured layer and the substrate layer when molding the container, and if more than 90 μm, resin whiskers may be generated when punching out the thermoformed container.

<Styrenic Resin Layer (2b): Substrate Layer>

Examples of the styrenic resin used for the styrenic resin layer to form the substrate layer include homo- or copolymers of styrenic monomers such as styrene, α-methylstyrene, p-methylstyrene, dimethylstyrene, p-t-butylstyrene and chlorostyrene, copolymers of said styrenic monomers with other monomers, such as styrene-acrylonitrile copolymers (AS resins), or graft polymers obtained by graft polymerization of said styrenic monomers with other polymers in the presence of dienic rubber polymers such as polybutadiene, styrene-butadiene copolymers, polyisoprene and polychloroprene, such as high-impact polystyrene (HIPS resins) and styrene-acrylonitride graft polymers (ABS resins).

Of these, polystyrene (GPPS resins) and high-impact polystyrene (HIPS resins) are preferable in view of rigidity and moldability of the molded container.

The styrenic resin preferably comprises 4.5 to 8.1 mass % of a butadiene rubber component. While a convenient method is to adjust the butadiene rubber component content by the blend of GPPS and HIPS, it could also be adjusted during the HIPS production stage. If less than 4.5 mass %, then the container strength may not be sufficient for practical use, and if more than 8.1 mass %, this may cause problems such as adhesion of the heating platen during thermoforming.

Additives may be added to the styrenic resin layer as needed within a range not interfering with the effects of the present invention, including colorants such as pigments and dyes, mold release agents such as silicone oils and alkyl esters, fiber reinforcing agents such as glass fibers, particulate lubricants such as talc, clay and silica, antistatic agents such as salt compounds of sulfonic acid and alkali metals and polyalkylene glycol, UV absorbing agents, and antimicrobial agents. Additionally, scrap resins generated during the production process of the multilayered resin sheet of molded article of the present invention may be mixed and used.

Fourth Embodiment

The thermoplastic multilayered resin sheet according to a fourth embodiment of the present invention, as shown in FIG. 6, is a sheet having water repellence, comprising a textured layer (1) formed from a polyethylene resin composition containing a water repellent agent and having a microscopic texture on one surface side, having laminated on the other surface side an oxygen barrier resin layer (4) with one surface thereof on the textured layer side and sequentially from the textured layer side, a sealant resin layer (5) and a modified olefinic polymer resin layer (6a) interposed therebetween, and on the other face of the oxygen barrier resin layer, a styrenic resin layer (2b) laminated with a modified olefinic polymer resin layer (6b) interposed therebetween. In other words, the layer structure of the thermoplastic resin sheet according to the fourth embodiment, from top to bottom, consists of textured layer (1)/sealant resin layer (5)/modified olefinic resin layer (6a)/oxygen barrier resin layer (4)/modified olefinic polymer resin layer (6b)/styrenic resin layer (2b).

Since the textured layer is the same as that explained for the first embodiment and the styrenic resin layer (substrate layer) (2b) is the same as that explained for the third embodiment, their explanations will be omitted. However, the thickness of the textured layer is preferably 80 to 250 μm. If less than 80 μm, the textured layer can be ruptured when stretched after thermoforming, which may expose the sealant resin layer (5). Additionally, if 250 μm is exceeded, the production cost of the container may be too high.

<Sealant Resin Layer (5)>

The sealant resin is a resin composition comprising one or more of a styrene-butadiene block (SBS) copolymer, a styrene-ethylene-butylene-styrene (SEBS) or styrene-butadiene-butylene-styrene (SBBS) which is obtained by hydrogenating a styrene-butadiene copolymer, of which a SEBS obtained by hydrogenating a styrene-butadiene copolymer is preferable. The thickness of the sealant resin layer should preferably be 10 to 50 μm, more preferably 20 to 40 μm. If less than 10 μm, sufficient interlayer adhesive strength may not be obtained, and if more than 50 μm, resin whiskers may be generated when punching out the thermoformed container.

<Oxygen Barrier Resin Layer (4)>

Representative examples of oxygen barrier resins that may be used to form the oxygen barrier resin layer include ethylene-vinyl alcohol copolymer resins and polyamide resins. Of these, ethylene-vinyl alcohol copolymer resins are preferable in terms of processability and moldability.

Ethylene-vinyl alcohol copolymer resins are usually obtained by saponification of ethylene-vinyl acetate copolymers, and in order to achieve an oxygen barrier capability, processability and moldability, those with an ethylene content of 10 to 65 mol %, preferably 20 to 50 mol %, and a degree of saponification of at least 90%, and preferably at least 95% are preferred.

Additionally, examples of polyamide resins include lactam polymers such as caprolactam and laurolactam, polymers of aminocarboxylic acids such as 6-aminocapronic acid, 11-aminoundecanoic acid and 12-aminododecanoic acid, and polycondensates of diamine units including aliphatic diamines such as hexamethylene diamine, decamethylene diamine, dodecamethylene diamine and 2,2,4- or 2,4,4-trimethylhexamethylene diamine, alicyclic diamines such as 1,3- or 1,4-bis(aminomethyl)cyclohexane and bis(p-aminocyclohexylmethane), and aromatic diamines such as m- or p-xylylene diamine with dicarboxylic acid units such as aliphatic dicarboxylic acids such as adipic acid, suberic acid and sebacic acid, acyclic dicarboxylic acids such as cyclohexane dicarboxylic acid, and aromatic dicarboxylic acids such as terephthalic acid and isophthalic acid.

Specific polyamide resins include nylon-6, nylon-9, nylon-11, nylon-12, nylon-66, nylon-610, nylon-611, nylon-612, nylon-6T, nylon-6I, nylon-MXD6, nylon-6/66, nylon-6/610, nylon-6/6T and nylon 6I/6T, of which nylon-6 and nylon-MXD6 are preferred.

The thickness of the oxygen barrier resin layer is preferably 10 to 50 μm, more preferably 20 to 40 μm. If less than 10 μm, the oxygen barrier capability may not be sufficient to prevent loss of quality due to oxidation of the content of the molded container, and if more than 50 μm, resin whiskers may be generated when punching out the thermoformed container.

<Modified Olefinic Polymer Resin Layer (6a, 6b)>

Examples of the modified olefinic polymer resin used to form the modified olefinic polymer resin layers include olefinic resins such as polymers of a single olefin with 2 to 8 carbon atoms, such as ethylene, propylene and butene-1, and copolymers of said olefins with other olefins with 2 to 20 carbon atoms such as ethylene, propylene, butene-1, 3-methylbutene-1, pentene-1, 4-methylpentene-1, hexene-1, octene-1 and decene-1, or with vinyl compounds such as vinyl acetate, vinyl chloride, acrylic acid, methacrylic acid, acrylic acid esters, methacrylic acid esters and styrenes, or olefinic rubbers such as ethylene-propylene copolymers, ethylene-propylene-diene copolymers, ethylene-butene-1 copolymers and propylene-butene-1 copolymers, modified under graft reaction conditions with unsaturated carboxylic acids such as acrylic acid, methacrylic acid, crotonic acid, isocrotonic acid, maleic acid, fumaric acid, ithaconic acid, citraconic acid and tetrahydrophthalic acid, or derivatives such as acid halides, amides, imides, anhydrides and esters thereof, specifically malenyl chloride, maleimide, maleic acid anhydride, citraconic acid anhydride, monomethyl maleate, dimethyl maleate and glycidyl maleate.

Of these, ethylenic resins, propylenic resins, or ethylene-propylene or butene-1 copolymer rubbers modified with unsaturated dicarboxylic acids or anhydrides thereof, particularly maleic acid or anhydrides thereof, are preferred.

The thickness of the modified olefinic polymer resin layer, on both sides, should preferably be 10 to 50 μm, more preferably 20 to 40 μm. If less than 10 μm, sufficient interlayer adhesive strength may not be obtained, and if more than 50 μm, resin whiskers may be generated when punching out the thermoformed container.

<Production of Thermoplastic Resin Sheet>

The method for producing a thermoplastic resin sheet according to the present invention is not limited, and may be any method, but it will typically include steps of producing a single layer sheet consisting of a textured layer having texture on one surface side or a multilayered laminated resin sheet having said textured layer, then performing a crosslinking treatment by irradiating the surface of the texture on the textured layer with electron beams, and finally forming a water repellent layer on the surface of the texture of the textured layer.

First, when producing the single layer sheet consisting of a textured layer having texture on one surface side or the multilayered laminated resin sheet having said textured layer, any method of forming a resin sheet may be used. For example, the respective raw material resins can be melt-extruded using a single uniaxial extruder in the case of a single layer, or in the case of multiple layers, using plural uniaxial extruders, then obtaining resin sheets using a T-die. In the case of multiple layers, a multi-manifold die may be used. While the layer structures of the respective embodiments of the thermoplastic resin sheet of the present invention are basically as described above, it is also possible to add scrap raw material generated during the production process of the resin sheet or molded container of the present invention to the styrenic resin layer as long as no degradation in physical properties or the like is observed, or to laminate the material as further layers.

Next, a texture is formed on the single layer or laminated multilayered resin sheet, but this method is also not particularly restricted, and any method known to those skilled in the art may be used. Examples include methods of production using an extrusion molding system, methods of production using a photolithography system, methods of production using a hot press system, and methods of production using patterned rollers and UV-cured resins.

Next, in order to preserve the texture of the textured layer even after thermoforming so as to maintain the desired water repellence, at least a surface portion of the textured layer is crosslinked. In this case, "at least a surface portion of the textured layer" refers to a surface portion of the textured layer to form the sheet surface, including almost the entire textured portion. This crosslinking treatment can be performed by irradiating the sheet surface on which the textured layer of the resin sheet lies with electron beams. In other words, as mentioned above, the textured layer is formed using a composition comprising a polyethylene resin. Polyethylenes, like polypropylenes, polyvinylidene fluorides, polymethyl acrylates, polyvinyl chlorides, polybutadienes, vinyl alcohols and polyamides, are crosslinking polymers in which molecular crosslinking occurs preferentially as a result of electron beam irradiation, among which linear low-density polyethylenes and linear medium-density polyethylenes easily crosslink, and linear low-density polyethylenes in particular tend to crosslink most easily. Therefore, when the sheet surface on which the textured layer lies is irradiated with electron beams, at least the surface portion of the textured layer can be crosslinked.

The conditions for electron beam irradiation of the polyethylene resin are an acceleration voltage of 110 to 250 kV and a radiation dose of 150 to 300 kGy. By irradiating the surface of the textured sheet with electron beams in this range of conditions, at least the surface portion can be converted to a crosslinked material that maintains the texture even after thermoforming. Additionally, even if the entire textured sheet is irradiated in the case of a single layer, only a small dose of the electron beam radiation reaches the opposite face from that on which the texture is formed, so there is no risk of the physical properties being affected, and even if the radiation penetrates past the textured layer in the case of multiple layers, only a small dose of the electron beam radiation reaches the sealant resin layer, so there is no risk of the interlayer adhesion being affected. On the other hand, if the radiation conditions are weaker than these conditions, then the textured portion of the textured layer cannot be crosslinked to a degree enabling its shape to be roughly maintained even after heated drawing, and if the radiation conditions are stronger than these conditions, there is a risk of sealing defects occurring with the lid member used for packaging (insufficient peel strength being obtained). While the degree of crosslinking of the crosslinked material formed on the textured layer is not particularly limited, the crosslinking should be such that, when the thermoplastic multilayered resin sheet is subjected to heated drawing at a draw ratio of 0.05 to 2.5 times, the height of the bumps is adequately maintained before and after drawing, preferably such that the rate of decrease in height is 30% or less, more preferably 25% or less, and even more preferably 20% or less. While the above-described drawing ratios are examples of drawing ratios for the edge portions of a container when molding containers for use with food products, even in molded containers for other applications, the degree of crosslinking can be set as an indicator of the rate of decrease in height of bumps when performing heated drawing under the same conditions, and containers molded by means of sheets satisfying these conditions can achieve the desired water repellence when in conjunction with the water repellence due to the aforementioned water repellent agent.

<Thermoplastic Resin Sheet>

The thickness of the thermoplastic resin sheet of the present invention is preferably 500 to 1200 μm, more preferably 700 to 1000 μm. At less than 500 μm, the strength of the container obtained by thermoforming can be insufficient, and at more than 1200 μm, the production cost of the container can become too high.

The thermoplastic resin sheet according to the present invention is provided with a textured layer that contains a water repellent agent and retains a microscopic texture even after heated drawing on one face of the sheet, so the water repellence due to the microscopic texture and the water repellent agent together result in exceptional water repellence. In other words, with the thermoplastic resin sheet of the present invention, as mentioned above, the angle of contact of liquids is at least 100°, so that it has sufficient water repellence and liquids slide across the sheet. If the angle of contact is less than 100°, then liquids may not slide across the sheet, in which case it cannot be considered to have water repellence.

<Molded Container>

The molded container of the present invention is formed by thermoforming the thermoplastic resin sheet of the present invention, and is preferably a container for food products, for example, a yogurt container. While thermoforming methods include general vacuum forming and pressure forming, and as applications thereof, plug-assist methods wherein a plug is brought into contact with one face of the sheet, and methods referred to as so-called match molding wherein molding is performed while contacting male and female molds forming a pair with both surfaces of the sheet, the methods are not restricted thereto. Additionally, as methods of heat-softening sheets before molding, publicly known sheet heating methods such as radiation heating by means of an infrared heater or the like, which is a non-contact heating method, may be used.

The molded container of the present invention has water repellence. That is, as mentioned above, at an upper edge portion of the molded container, the angle of contact of liquids is at least 100°, and if the angle of contact is less than 100°, sufficient water repellence may not be obtained at the upper edge portion of the molded container, in which case it cannot be considered to have water repellence.

EXAMPLES

While the present invention will be explained in detail below by giving examples and comparative examples, the present invention is not to be construed as being limited in any way by the content of the examples etc.

The raw materials used in the examples etc. are as follows.

(1) Textured Layer
 (A) Linear low-density polyethylene resin: "UF240" (Japan Polyethylene)
 (B) Silicone-based water repellent agent (resin composition consisting of silicone resin/olefinic resin): "Clinbell 30PE" (Fuji Chem; silicone resin content 30 mass %)
 (C) Carnauba wax (Nikko Rica)

(2) Sealant Resin Layer and Modified Olefinic Polymer Resin Layer
 (D) High-impact polystyrene resin "Toyostyrol H850N" (Toyo Styrene, butadiene content 9.0 mass %)
 (E) Hydrogenated styrenic thermoplastic elastomer "Tuftec P2000" (Asahi Kasei)
 (F) Modified olefinic polymer resin "Modic F502" (Mitsubishi Chemical)
 (G) Hydrogenated styrenic thermoplastic elastomer "Tuftec H1041" (Asahi Kasei)

(3) Styrenic Resin Layer
 (D) High-impact polystyrene resin "Toyostyrol H850N" (Toyo Styrene, butadiene content 9.0 mass %)
 (E) Hydrogenated styrenic thermoplastic elastomer "Tuftec P2000" (Asahi Kasei)
 (H) GPPS resin "FIRM 23" (Toyo Styrene)

(4) Oxygen Barrier Resin Layer
 (I) Ethylene-vinyl alcohol copolymer "Eval J-102B" (Kuraray, ethylene content 32 mol %, saponification 99% or more)

The methods for evaluation of various properties of the thermoplastic resin sheets produced in the examples and containers molded using said thermoplastic resin sheets are as follows.

(1) Moldability

The moldability of yogurt containers was evaluated under the following criteria:

Good: good moldability

Poor: holes form during heating and molding, molding defects occur (2) Texture Observation The texture on the surface portion of the sheets and the texture at the upper edge portions of the molded yogurt containers (see FIG. 7) were observed using a laser microscope VK-X 100 (Keyence), the sheets were measured for bump height, bump diameter and bump pitch, and for the yogurt containers, only the bump heights were recorded. Additionally, samples for observation of the texture cross section were produced using microtomes.

(3) Drawing Ratio

The drawing ratio was calculated for the molded yogurt containers, by measuring the thickness of the upper edge portions (see FIG. 7) of the container, and using the following formula:

Drawing ratio: sheet thickness/molded article edge thickness (4) Decrease in Bump Height The decrease in bump height was calculated for the molded yogurt containers, by measuring the bump height in the upper edge portions of the container (see FIG. 7), and using the following formula:

$$\text{Bump height decrease} = \frac{\text{Bump height on sheet} - \text{Bump height at molded article edge}}{\text{Bump height on sheet}} \times 100 \quad \text{[Formula 1]}$$

If the decrease in bump height is 30% or less, then the microscopic texture can be considered to be maintained before and after molding.

(5) Angle of Contact

The angle of contact was measured for the sheet and molded yogurt container using an automatic contact angle meter DM-501 (Kyowa Interface Science). For the yogurt container, an upper edge portion of the container (see FIG. 7) was measured. Additionally, as the test liquid, yogurt (Morinaga Milk Industry "Bifidus Plain") was used, the amount dropped being 2 μL.

If the angle of contact is at least 100°, the water repellence can be considered to be high, and the adhesion of yogurt can be judged to be prevented.

(6) Punchability

After punching out the molded yogurt container (see FIG. 8), the cut face of the container was observed visually, and evaluated according to the following criteria.

Good: no resin whiskers observed on cut surface Poor: resin whiskers and burrs observed on cut surface (7) Container Strength The strength of the molded yogurt container was measured using a strograph VE1D (Toyo Seiki) in accordance with the JIS K7181 standard, at a testing speed of 50 mm/min, and those with a compression strength of at least 25 N were judged to be good.

(8) Oxygen Permeability

The oxygen permeability was measured using an OX-TRAN oxygen permeability measuring device (Mocon) in accordance with the JIS K7126-B standard, under measurement conditions of a temperature of 25° C. and a relative humidity of 65%. The oxygen barrier capability can be judged to be good when the oxygen permeability is less than 3.0 ml/m²·day·atm.

Example 1 (Layer Structure of FIG. 1)

A 40 mm uniaxial extruder was used to extrude a resin sheet of thickness 900 μm by a T-die method This resin sheet was formed with a polyethylene resin composition obtained by mixing 90 mass % of a polyethylene resin and 10 mass % of a silicone-based water repellent agent (the silicone resin content being 3 mass % with respect to the total mass of the textured layer).

The resin sheet obtained as described above was hot press formed using a plate-shaped mold 260 mm on a side produced by an etching method under the below-indicated conditions, to provide a microscopic texture on the textured layer of the resin sheet.

| Equipment used: | Hot Press MP-WNL (Toyo Seiki) |
| --- | --- |
| Upper heating platen temperature: | 135° C. |
| Lower heating platen temperature: | 135° C. |
| Press force: | 16 MPa |

A thermoplastic resin sheet provided with a texture as obtained above was irradiated with electron beams using an electron beam irradiation device (Eye Electron Beam) under irradiation conditions according to irradiation conditions of acceleration voltage 200 kV and radiation dose 250 kGy, to perform crosslinking of the textured layer. The composition, thickness and electron beam irradiation conditions of thermoplastic resin sheets formed in this way are shown in Table 1.

The resin sheets prepared as described above were evaluated as to their various properties by the methods described above. Additionally, using the resulting resin sheets, molded yogurt containers were produced in a vacuum/pressure former (Asano Laboratories) using a mold for yogurt containers (see FIG. 7), and the various properties of the containers were also evaluated by the methods described above. The results are shown in Table 2.

TABLE 1

| | | Thermoplastic Resin Sheet (Single Layer) | | | | | |
| --- | --- | --- | --- | --- | --- | --- | --- |
| | | (A) | (B) Silicone Resin | | Silicone Resin and | Electron Beam Irradiation | |
| | | Polyethylene Resin | and Polyolefinic Resin Composition | (C) Carnauba Wax | Carnauba Wax Content (%) | Acceleration Voltage (KV) | Radiation Dose (KGy) |
| Example 1 | Composition (mass %) | 90 | 10 | — | 3 | 200 | 250 |
| | Thickness (μm) | | 900 | | | | |
| Example 2 | Composition (mass %) | 80 | 20 | — | 6 | 200 | 250 |
| | Thickness (μm) | | 900 | | | | |
| Example 3 | Composition (mass %) | 70 | 30 | — | 9 | 150 | 200 |
| | Thickness (μm) | | 900 | | | | |
| Example 4 | Composition (mass %) | 80 | 20 | — | 6 | 150 | 200 |
| | Thickness (μm) | | 900 | | | | |
| Example 5 | Composition (mass %) | 80 | 20 | — | 6 | 200 | 250 |
| | Thickness (μm) | | 900 | | | | |
| Example 6 | Composition (mass %) | 80 | 20 | — | 6 | 150 | 200 |
| | Thickness (μm) | | 900 | | | | |
| Example 7 | Composition (mass %) | 80 | 20 | — | 6 | 200 | 250 |
| | Thickness (μm) | | 900 | | | | |

TABLE 1-continued

| | | Thermoplastic Resin Sheet (Single Layer) | | | | | |
|---|---|---|---|---|---|---|---|
| | | (A) Polyethylene Resin | (B) Silicone Resin and Polyolefinic Resin Composition | (C) Carnauba Wax | Silicone Resin and Carnauba Wax Content (%) | Electron Beam Irradiation | |
| | | | | | | Acceleration Voltage (KV) | Radiation Dose (KGy) |
| Example 8 | Composition (mass %) | 75 | 25 | — | 7.5 | 200 | 250 |
| | Thickness (μm) | | 900 | | | | |
| Example 9 | Composition (mass %) | 75 | 25 | — | 7.5 | 200 | 250 |
| | Thickness (μm) | | 900 | | | | |
| Example 10 | Composition (mass %) | 95 | — | 5 | 5 | 150 | 200 |
| | Thickness (μm) | | 900 | | | | |
| Comparative Example 1 | Composition (mass %) | 100 | — | — | — | 200 | 250 |
| | Thickness (μm) | | 900 | | | | |
| Comparative Example 2 | Composition (mass %) | 90 | 10 | — | 3 | 200 | 250 |
| | Thickness (μm) | | 900 | | | | |
| Comparative Example 3 | Composition (mass %) | 90 | 10 | — | 3 | — | — |
| | Thickness (μm) | | 900 | | | | |
| Comparative Example 4 | Composition (mass %) | | HIPS (Bd content 9%) | | — | 200 | 250 |
| | Thickness (μm) | | 900 | | | | |
| Comparative Example 5 | Composition (mass %) | 90 | 10 | — | 3 | 200 | 325 |
| | Thickness (μm) | | 900 | | | | |

TABLE 2

| | Thermoplastic Resin Sheet (Single Layer) Evaluation (Before Thermoforming) | | | | |
|---|---|---|---|---|---|
| | Bump Height (μm) | Bump Diameter (μm) | Bump Pitch (μm) | Bump Arrangement | Contact Angle (°) Yogurt |
| Example 1 | 85 | 160 | 27 | staggered | 121 |
| Example 2 | 85 | 160 | 27 | staggered | 123 |
| Example 3 | 85 | 160 | 27 | staggered | 119 |
| Example 4 | 85 | 160 | 27 | grid | 126 |
| Example 5 | 95 | 180 | 40 | staggered | 128 |
| Example 6 | 95 | 180 | 40 | staggered | 127 |
| Example 7 | 95 | 180 | 40 | grid | 126 |
| Example 8 | 200 | 450 | 20 | grid | 129 |
| Example 9 | 200 | 450 | 20 | grid | 130 |
| Example 10 | 85 | 160 | 56 | staggered | 119 |
| Comparative Example 1 | 85 | 160 | 56 | grid | 114 |
| Comparative Example 2 | | untextured | | — | 99 |
| Comparative Example 3 | 85 | 160 | 56 | staggered | 122 |
| Comparative Example 4 | 85 | 160 | 56 | staggered | 110 |
| Comparative Example 5 | 85 | 160 | 56 | staggered | 112 |

| | Molded Article Evaluation (After Thermoforming) | | | | |
|---|---|---|---|---|---|
| | Drawing Ratio (%) | Bump Height (μm) | Decrease (%) | Contact Angle (°) Yogurt | Mold-ability |
| Example 1 | 1.8 | 72 | 15 | 115 | good |
| Example 2 | 1.9 | 70 | 18 | 113 | good |
| Example 3 | 2.1 | 65 | 24 | 112 | good |
| Example 4 | 2.3 | 61 | 28 | 108 | good |
| Example 5 | 1.7 | 81 | 15 | 114 | good |
| Example 6 | 2.0 | 79 | 17 | 110 | good |
| Example 7 | 1.7 | 80 | 16 | 109 | good |
| Example 8 | 1.7 | 158 | 21 | 110 | good |
| Example 9 | 1.8 | 160 | 20 | 111 | good |
| Example 10 | 2.5 | 60 | 29 | 103 | good |
| Comparative Example 1 | 4.0 | 37 | 56 | 93 | good |
| Comparative Example 2 | 1.8 | — | — | 97 | good |
| Comparative Example 3 | 1.8 | 23 | 73 | 98 | good |

TABLE 2-continued

| | | | | | |
|---|---|---|---|---|---|
| Comparative Example 4 | 1.8 | 15 | 82 | 92 | good |
| Comparative Example 5 | Ruptured due to drawing when molding the container | | | | |

Examples 2-10, Comparative Examples 1-5

Resin sheets according to Examples 2-10 and Comparative Examples 1-5 were prepared in the same manner as Example 1, apart from the compositions and thicknesses of the textured sheet, and the electron beam irradiation conditions, which were set as shown in Table 1, and these were molded into yogurt containers.

In Comparative Example 1, no water repellent agent was added, and the edge portions of the yogurt container were thermoformed to a drawing ratio of 4 times, in Comparative Example 2, no texturing was performed, in Comparative Example 3, crosslinking by electron beam irradiation was not performed, in Comparative Example 4, a single layer sheet of only a styrenic resin composition was used, and in Comparative Example 5, the radiation dose for electron beam irradiation was set to 325 kGy.

The following is clear from the results shown in Table 2.

In all of Examples 1-10, results satisfying all the criteria for water repellence in the case of sheets, and bump height decrease, water repellence and moldability in the case of molded articles were obtained. On the other hand, in Comparative Example 1, water repellence was not obtained at the edge portions of the yogurt container, in Comparative Example 2, water repellence was not obtained at the edge portions of the yogurt container, in Comparative Example 3, electron beam crosslinking was not performed and the bump height at the edge portions of the yogurt container was not maintained, so water repellence was not obtained, in Comparative Example 4, only a styrenic resin composition was used, and the bump height at the edge portions of the yogurt container was not maintained, so water repellence was not obtained, and in Comparative Example 5, the sheet was ruptured by drawing at the time of yogurt container molding.

Example 11 (Layer Structure of FIG. 4)

Two 40 mm uniaxial extruders were used to extrude from a T-die a multilayered resin sheet of thickness 900 μm having a layer structure consisting of a 100 μm textured layer/800 μm styrenic resin layer, by means of a feed block process. The textured layer was formed by a polyethylene resin composition obtained by mixing 90 mass % of a polyethylene resin and 10 mass % of a silicone-based water repellent agent (the silicone resin content being 3 mass % with respect to the total mass of the textured layer), and as the styrenic resin, a mix of a HIPS resin, a GPPS resin and a hydrogenated styrenic thermoplastic elastomer at a mass ratio of 80/20/5 (HIPS/GPPS/SBBS) was used (butadiene rubber component content of the HIPS resin in the substrate layer: 7.2 mass %).

The multilayered resin sheet obtained as described above was hot press formed using a plate-shaped mold 260 mm on a side produced by an etching method under the below-indicated conditions, to provide a microscopic texture on the textured layer of the multilayered resin sheet.

| | |
|---|---|
| Equipment used: | Hot Press MP-WNL (Toyo Seiki) |
| Upper heating platen temperature: | 135° C. |
| Lower heating platen temperature: | 135° C. |
| Press force: | 16 MPa |

A thermoplastic multilayered resin sheet provided with a texture as obtained above was irradiated with electron beams using an electron beam irradiation device (Eye Electron Beam) under irradiation conditions according to irradiation conditions of acceleration voltage 200 kV and radiation dose 250 kGy, to perform crosslinking of the textured layer. The compositions of the respective layers, layer structure, thickness and electron beam irradiation conditions of thermoplastic resin sheets formed in this way are shown in Table 3.

The multilayered resin sheets prepared as described above were evaluated as to their various properties by the methods described above. Additionally, using the resulting multilayered resin sheets, molded articles of yogurt containers (see FIG. 7) were produced in a vacuum/pressure former (Asano Laboratories) using a mold for yogurt containers, and the various properties of the containers were also evaluated by the methods described above. The results are shown in Table 4.

TABLE 3

| | | Textured Layer | | | | Styrenic Resin Layer | |
|---|---|---|---|---|---|---|---|
| | | | (B) Silicone | | | | |
| | | (A) Polyethylene Resin | Resin and Polyolefinic Resin Composition | (C) Carnauba Wax | Silicone Resin and Carnauba Wax Content (%) | (D) High Impact Polystyrene Resin | (H) Polystyrene Resin |
| Example 11 | Composition (mass %) | 90 | 10 | — | 3 | 80 | 20 |
| | Layer thickness (μm) | | 100 | | | 800 | |
| Example 12 | Composition (mass %) | 80 | 20 | — | 6 | 70 | 30 |
| | Layer thickness (μm) | | 100 | | | 800 | |
| Example 13 | Composition (mass %) | 70 | 30 | — | 9 | 80 | 20 |
| | Layer thickness (μm) | | 100 | | | 800 | |
| Example 14 | Composition (mass %) | 80 | 20 | — | 6 | 65 | 35 |
| | Layer thickness (μm) | | 100 | | | 800 | |
| Example 15 | Composition (mass %) | 80 | 20 | — | 6 | 70 | 30 |
| | Layer thickness (μm) | | 130 | | | 770 | |

TABLE 3-continued

| | | | | | | | |
|---|---|---|---|---|---|---|---|
| Example 16 | Composition (mass %) | 80 | 20 | — | 6 | 80 | 20 |
| | Layer thickness (μm) | | 130 | | | 770 | |
| Example 17 | Composition (mass %) | 80 | 20 | — | 6 | 65 | 35 |
| | Layer thickness (μm) | | 130 | | | 770 | |
| Example 18 | Composition (mass %) | 75 | 25 | — | 7.5 | 80 | 20 |
| | Layer thickness (μm) | | 220 | | | 680 | |
| Example 19 | Composition (mass %) | 75 | 25 | — | 7.5 | 70 | 30 |
| | Layer thickness (μm) | | 220 | | | 680 | |
| Example 20 | Composition (mass %) | 95 | — | 5 | 5 | 80 | 20 |
| | Layer thickness (μm) | | 100 | | | 800 | |
| Comparative Example 6 | Composition (mass %) | 100 | — | — | — | 80 | 20 |
| | Layer thickness (μm) | | 100 | | | 800 | |
| Comparative Example 7 | Composition (mass %) | 100 | — | — | — | 30 | 70 |
| | Layer thickness (μm) | | 100 | | | 800 | |
| Comparative Example 8 | Composition (mass %) | 90 | 10 | — | 3 | 30 | 70 |
| | Layer thickness (μm) | | 100 | | | 800 | |
| Comparative Example 9 | Composition (mass %) | 90 | 10 | — | 3 | 80 | 20 |
| | Layer thickness (μm) | | 350 | | | 550 | |
| Comparative Example 10 | Composition (mass %) | 80 | 20 | — | 6 | 65 | 35 |
| | Layer thickness (μm) | | 100 | | | 800 | |
| Comparative Example 11 | Composition (mass %) | — | — | — | — | 70 | 30 |
| | Layer thickness (μm) | | — | | | 900 | |

| | | Styrenic Resin Layer | | | |
|---|---|---|---|---|---|
| | | Rubber Component (mass %) | (E) Hydrogenated Styrenic Thermoplastic Elastomer (mass %) | Electron Beam Irradiation | |
| | | | | Acceleration Voltage (KV) | Radiation Dose (KGy) |
| Example 11 | Composition (mass %) | 7.2 | 5 | 200 | 250 |
| | Layer thickness (μm) | | | | |
| Example 12 | Composition (mass %) | 6.3 | 7 | 200 | 250 |
| | Layer thickness (μm) | | | | |
| Example 13 | Composition (mass %) | 7.2 | 10 | 150 | 200 |
| | Layer thickness (μm) | | | | |
| Example 14 | Composition (mass %) | 5.9 | 5 | 150 | 200 |
| | Layer thickness (μm) | | | | |
| Example 15 | Composition (mass %) | 6.3 | 5 | 200 | 250 |
| | Layer thickness (μm) | | | | |
| Example 16 | Composition (mass %) | 7.2 | 10 | 150 | 200 |
| | Layer thickness (μm) | | | | |
| Example 17 | Composition (mass %) | 5.9 | 7 | 200 | 250 |
| | Layer thickness (μm) | | | | |
| Example 18 | Composition (mass %) | 7.2 | 7 | 200 | 250 |
| | Layer thickness (μm) | | | | |
| Example 19 | Composition (mass %) | 6.3 | 5 | 200 | 250 |
| | Layer thickness (μm) | | | | |
| Example 20 | Composition (mass %) | 7.2 | 10 | 150 | 200 |
| | Layer thickness (μm) | | | | |
| Comparative Example 6 | Composition (mass %) | 7.2 | 5 | 200 | 250 |
| | Layer thickness (μm) | | | | |
| Comparative Example 7 | Composition (mass %) | 2.7 | 5 | 200 | 250 |
| | Layer thickness (μm) | | | | |
| Comparative Example 8 | Composition (mass %) | 2.7 | 7 | — | — |
| | Layer thickness (μm) | | | | |
| Comparative Example 9 | Composition (mass %) | 7.2 | 25 | — | — |
| | Layer thickness (μm) | | | | |
| Comparative Example 10 | Composition (mass %) | 5.9 | — | interlayer separation occurred | |
| | Layer thickness (μm) | | | | |
| Comparative Example 11 | Composition (mass %) | 6.3 | — | 200 | 250 |
| | Layer thickness (μm) | | | | |

TABLE 4

| | Thermoplastic Multilayered Resin Sheet Evaluation (Before Thermoforming) | | | | | Molded Article Evaluation (After Thermoforming) | |
|---|---|---|---|---|---|---|---|
| | Bump Height (μm) | Bump Diameter (μm) | Bump Pitch (μm) | Bump Arrangement | Contact Angle (°) Yogurt | Drawing Ratio (%) | Bump Height (μm) |
| Example 11 | 85 | 160 | 27 | staggered | 122 | 1.8 | 71 |
| Example 12 | 85 | 160 | 27 | staggered | 123 | 1.9 | 70 |
| Example 13 | 85 | 160 | 27 | staggered | 120 | 2.1 | 66 |
| Example 14 | 85 | 160 | 27 | grid | 125 | 2.3 | 62 |
| Example 15 | 95 | 180 | 40 | staggered | 127 | 1.7 | 82 |

TABLE 4-continued

| | | | | | | | | |
|---|---|---|---|---|---|---|---|---|
| Example 16 | 95 | 180 | 40 | staggered | 126 | 2.0 | 80 | |
| Example 17 | 95 | 180 | 40 | grid | 125 | 1.7 | 81 | |
| Example 18 | 200 | 450 | 20 | grid | 128 | 1.7 | 155 | |
| Example 19 | 200 | 450 | 20 | grid | 131 | 1.8 | 159 | |
| Example 20 | 85 | 160 | 56 | staggered | 118 | 2.5 | 61 | |
| Comparative Example 6 | 85 | 160 | 56 | grid | 115 | 4.0 | 38 | |
| Comparative Example 7 | 95 | 180 | 40 | staggered | 113 | 1.8 | 76 | |
| Comparative Example 8 | | untextured | | — | 99 | 1.8 | — | |
| Comparative Example 9 | 85 | 160 | 56 | staggered | 121 | 1.8 | 22 | |
| Comparative Example 10 | | | Interlayer separation occurred between the textured layer and the substrate layer | | | | | |
| Comparative Example 11 | 85 | 160 | 56 | staggered | 116 | 1.8 | 9 | |

| | Molded Article Evaluation (After Thermoforming) | | | | |
|---|---|---|---|---|---|
| | Decrease (%) | Contact Angle (°) Yogurt | Moldability | Punchability | Container Strength |
| Example 11 | 16 | 117 | good | good | good |
| Example 12 | 18 | 114 | good | good | good |
| Example 13 | 22 | 113 | good | good | good |
| Example 14 | 27 | 110 | good | good | good |
| Example 15 | 14 | 115 | good | good | good |
| Example 16 | 16 | 111 | good | good | good |
| Example 17 | 15 | 110 | good | good | good |
| Example 18 | 23 | 110 | good | good | good |
| Example 19 | 21 | 111 | good | good | good |
| Example 20 | 28 | 102 | good | good | good |
| Comparative Example 6 | 55 | 93 | good | good | good |
| Comparative Example 7 | 20 | 100 | good | good | poor |
| Comparative Example 8 | — | 97 | good | good | poor |
| Comparative Example 9 | 74 | 98 | good | poor | good |
| Comparative Example 10 | Interlayer separation occurred between the textured layer and the substrate layer | | | | |
| Comparative Example 11 | 89 | 92 | good | good | good |

Examples 12-20, Comparative Examples 6-11

Multilayered resin sheets according to Examples 12-20 and Comparative Examples 6-11 were prepared in the same manner as Example 11, apart from the compositions and thicknesses of the textured layer and the other layers of the multilayered resin sheet, and the electron beam irradiation conditions, which were set as shown in Table 3, and these were molded into yogurt containers.

In Comparative Example 6, no water repellent agent was added, and the edge portions of the yogurt container were thermoformed to a drawing ratio of 4 times, in Comparative Example 7, no water repellent agent was added, and the polystyrene resin in the substrate layer was 70 mass %, in Comparative Example 8, no texturing was performed, and the polystyrene resin in the substrate layer was 70 mass %, in Comparative Example 9, crosslinking by electron beam irradiation was not performed, and the hydrogenated styrenic thermoplastic elastomer in the substrate layer was 25 mass %, in Comparative Example 10, no hydrogenated styrenic thermoplastic elastomer was added to the substrate layer, and in Comparative Example 11, a single layer sheet of only a styrenic resin composition was used.

The following is clear from the results shown in Table 4.

In all of Examples 11-20, results satisfying all the criteria for water repellence in the case of sheets, and bump height decrease, water repellence, punchability and container strength in the case of molded articles were obtained. On the other hand, in Comparative Example 6, water repellence was not obtained at the edge portions of the yogurt container, in Comparative Example 7, some water repellence was obtained at the edge portions of the yogurt container, but the container strength was inadequate, and in Comparative Example 8, water repellence was not obtained in either the sheet or the edge portions of the yogurt container, and the container strength was also inadequate. In Comparative Example 9, electron beam crosslinking was not performed and the bump height at the edge portions of the yogurt container was not maintained, so water repellence was not obtained, and resin burrs also were generated when punching out the container. In Comparative Example 10, no styrenic resin composition was added to the substrate layer, so interlayer separation occurred between the textured layer and the substrate layer. In Comparative Example 11, the bump height at the edge portions of the yogurt container was not maintained, so water repellence was not obtained at the edge portions of the yogurt container.

Example 21 (Layer Structure of FIG. 5)

Three 40 mm uniaxial extruders were used to obtain a multilayered resin sheet of thickness 900 μm having a layer structure consisting of a 100 μm textured layer/20 μm sealant resin layer/780 μm styrenic resin layer, by means of a feed block process. The textured layer was formed by a polyethylene resin composition obtained by mixing 90 mass % of a polyethylene resin and 10 mass % of a silicone-based water repellent agent (the silicone resin content being 3 mass % with respect to the total mass of the textured layer), and as the styrenic resin, a mix of a HIPS resin and a GPPS resin at a mass ratio of 80/20 (HIPS/GPPS) was used (butadiene rubber component content of the HIPS resin in the substrate layer: 7.2 mass %).

The multilayered resin sheet obtained as described above was hot press formed using a plate-shaped mold 260 mm on a side produced by an etching method under the below-indicated conditions, to provide a microscopic texture on the textured layer of the multilayered resin sheet.

| | |
|---|---|
| Equipment used: | Hot Press MP-WNL (Toyo Seiki) |
| Upper heating platen temperature: | 135° C. |
| Lower heating platen temperature: | 135° C. |
| Press force: | 16 MPa |

A thermoplastic resin sheet provided with a texture as obtained above was irradiated with electron beams using an electron beam irradiation device (Eye Electron Beam) under irradiation conditions according to irradiation conditions of acceleration voltage 200 kV and radiation dose 250 kGy, to perform crosslinking of the textured layer. The compositions of the respective layers, layer structure, thickness and electron beam irradiation conditions of thermoplastic resin sheets formed in this way are shown in Table 5.

The multilayered resin sheets prepared as described above were evaluated as to their various properties by the methods described above. Additionally, using the resulting resin sheets, molded articles in the form of molded yogurt containers (see FIG. 7) were produced in a vacuum/pressure former (Asano Laboratories) using a mold for yogurt containers, and the various properties of the containers were also evaluated by the methods described above. The results are shown in Table 6.

TABLE 5

| | | Textured Layer | | | | Sealant Resin Layer | | |
|---|---|---|---|---|---|---|---|---|
| | | (A) Polyethylene Resin | (B) Silicone Resin and Polyolefinic Resin Composition | (C) Carnauba Wax | Silicone Resin and Carnauba Wax Content (%) | (D) High Impact Polystyrene Resin | (E) Hydrogenated Styrenic Thermoplastic Elastomer | (F) Olefinic Polymer Resin |
| Example 21 | Composition (mass %) | 90 | 10 | — | 3 | 95 | 5 | — |
| | Layer thickness (μm) | | 100 | | | | 20 | |
| Example 22 | Composition (mass %) | 80 | 20 | — | 6 | 90 | 10 | — |
| | Layer thickness (μm) | | 100 | | | | 30 | |
| Example 23 | Composition (mass %) | 70 | 30 | — | 9 | 90 | 10 | — |
| | Layer thickness (μm) | | 100 | | | | 40 | |
| Example 24 | Composition (mass %) | 80 | 20 | — | 6 | — | — | 100 |
| | Layer thickness (μm) | | 100 | | | | 30 | |
| Example 25 | Composition (mass %) | 80 | 20 | — | 6 | — | — | 100 |
| | Layer thickness (μm) | | 130 | | | | 30 | |
| Example 26 | Composition (mass %) | 80 | 20 | — | 6 | — | — | — |
| | Layer thickness (μm) | | 130 | | | | 20 | |
| Example 27 | Composition (mass %) | 80 | 20 | — | 6 | — | — | — |
| | Layer thickness (μm) | | 130 | | | | 35 | |
| Example 28 | Composition (mass %) | 75 | 25 | — | 7.5 | — | — | 100 |
| | Layer thickness (μm) | | 220 | | | | 20 | |
| Example 29 | Composition (mass %) | 75 | 25 | — | 7.5 | — | — | — |
| | Layer thickness (μm) | | 220 | | | | 30 | |
| Example 30 | Composition (mass %) | 95 | — | 5 | 5 | — | — | — |
| | Layer thickness (μm) | | 100 | | | | 20 | |
| Comparative Example 12 | Composition (mass %) | 100 | — | — | — | 90 | 10 | — |
| | Layer thickness (μm) | | 100 | | | | 20 | |
| Comparative Example 13 | Composition (mass %) | 100 | — | — | — | — | — | — |
| | Layer thickness (μm) | | 100 | | | | 30 | |
| Comparative Example 14 | Composition (mass %) | 90 | 10 | — | 3 | — | — | 100 |
| | Layer thickness (μm) | | 100 | | | | 30 | |
| Comparative Example 15 | Composition (mass %) | 90 | 10 | — | 3 | 60 | 40 | — |
| | Layer thickness (μm) | | 350 | | | | 120 | |
| Comparative Example 16 | Composition (mass %) | 80 | 20 | — | 6 | — | — | — |
| | Layer thickness (μm) | | 100 | | | | — | |
| Comparative Example 17 | Composition (mass %) | — | — | — | — | — | — | — |
| | Layer thickness (μm) | | — | | | | — | |

| | | Sealant Resin Layer | Styrenic Resin Layer | | | Electron Beam Irradiation | |
|---|---|---|---|---|---|---|---|
| | | (G) Hydrogenated Styrenic Thermoplastic Elastomer | (D) High Impact Polystyrene Resin | (H) Polystyrene Resin | Rubber Component (mass %) | Acceleration Voltage (KV) | Radiation Dose (KGy) |
| Example 21 | Composition (mass %) | — | 80 | 20 | 7.2 | 200 | 250 |
| | Layer thickness (μm) | 20 | | 780 | | | |
| Example 22 | Composition (mass %) | — | 70 | 30 | 6.3 | 200 | 250 |
| | Layer thickness (μm) | 30 | | 770 | | | |
| Example 23 | Composition (mass %) | — | 80 | 20 | 7.2 | 150 | 200 |
| | Layer thickness (μm) | 40 | | 760 | | | |

TABLE 5-continued

| | | | | | | | |
|---|---|---|---|---|---|---|---|
| Example 24 | Composition (mass %) | — | 65 | 35 | 5.9 | 150 | 200 |
| | Layer thickness (μm) | 30 | 770 | | | | |
| Example 25 | Composition (mass %) | — | 70 | 30 | 6.3 | 200 | 250 |
| | Layer thickness (μm) | 30 | 740 | | | | |
| Example 26 | Composition (mass %) | 100 | 80 | 20 | 7.2 | 150 | 200 |
| | Layer thickness (μm) | 20 | 750 | | | | |
| Example 27 | Composition (mass %) | 100 | 65 | 35 | 5.9 | 200 | 250 |
| | Layer thickness (μm) | 35 | 735 | | | | |
| Example 28 | Composition (mass %) | — | 80 | 20 | 7.2 | 200 | 250 |
| | Layer thickness (μm) | 20 | 660 | | | | |
| Example 29 | Composition (mass %) | 100 | 70 | 30 | 6.3 | 200 | 250 |
| | Layer thickness (μm) | 30 | 650 | | | | |
| Example 30 | Composition (mass %) | 100 | 80 | 20 | 7.2 | 150 | 200 |
| | Layer thickness (μm) | 20 | 780 | | | | |
| Comparative Example 12 | Composition (mass %) | — | 80 | 20 | 7.2 | 200 | 250 |
| | Layer thickness (μm) | 20 | 780 | | | | |
| Comparative Example 13 | Composition (mass %) | 100 | 30 | 70 | 2.7 | 200 | 250 |
| | Layer thickness (μm) | 30 | 770 | | | | |
| Comparative Example 14 | Composition (mass %) | — | 30 | 70 | 2.7 | — | — |
| | Layer thickness (μm) | 30 | 770 | | | | |
| Comparative Example 15 | Composition (mass %) | — | 80 | 20 | 7.2 | — | — |
| | Layer thickness (μm) | 120 | 430 | | | | |
| Comparative Example 16 | Composition (mass %) | — | 65 | 35 | 5.9 | Interlayer separation occurred | |
| | Layer thickness (μm) | — | 800 | | | | |
| Comparative Example 17 | Composition (mass %) | — | 70 | 30 | 6.3 | 200 | 250 |
| | Layer thickness (μm) | — | 900 | | | | |

TABLE 6

| | Thermoplastic Multilayered Resin Sheet Evaluation (Before Thermoforming) | | | | | Molded Article Evaluation (After Thermoforming) | |
|---|---|---|---|---|---|---|---|
| | Bump Height (μm) | Bump Diameter (μm) | Bump Pitch (μm) | Bump Arrangement | Contact Angle (°) Yogurt | Drawing Ratio (%) | Bump Height (μm) |
| Example 21 | 85 | 160 | 27 | staggered | 122 | 1.8 | 71 |
| Example 22 | 85 | 160 | 27 | staggered | 123 | 1.9 | 70 |
| Example 23 | 85 | 160 | 27 | staggered | 120 | 2.1 | 66 |
| Example 24 | 85 | 160 | 27 | grid | 125 | 2.3 | 62 |
| Example 25 | 95 | 180 | 40 | staggered | 127 | 1.7 | 80 |
| Example 26 | 95 | 180 | 40 | staggered | 127 | 2.0 | 78 |
| Example 27 | 95 | 180 | 40 | grid | 125 | 1.7 | 79 |
| Example 28 | 200 | 450 | 20 | grid | 128 | 1.7 | 157 |
| Example 29 | 200 | 450 | 20 | grid | 132 | 1.8 | 159 |
| Example 30 | 85 | 160 | 56 | staggered | 118 | 2.5 | 61 |
| Comparative Example 12 | 85 | 160 | 56 | grid | 112 | 4.0 | 36 |
| Comparative Example 13 | 95 | 180 | 40 | staggered | 114 | 1.8 | 74 |
| Comparative Example 14 | untextured | | — | | 99 | 1.8 | — |
| Comparative Example 15 | 85 | 160 | 56 | staggered | 120 | 1.8 | 22 |
| Comparative Example 16 | Interlayer separation occurred between the textured layer and the substrate layer | | | | | | |
| Comparative Example 17 | 85 | 160 | 56 | staggered | 115 | 1.8 | 8 |

| | Molded Article Evaluation (After Thermoforming) | | | | |
|---|---|---|---|---|---|
| | Decrease (%) | Contact Angle (°) Yogurt | Mold-ability | Punch-ability | Container Strength |
| Example 21 | 16 | 114 | good | good | good |
| Example 22 | 18 | 112 | good | good | good |
| Example 23 | 22 | 111 | good | good | good |
| Example 24 | 27 | 109 | good | good | good |
| Example 25 | 16 | 112 | good | good | good |
| Example 26 | 18 | 111 | good | good | good |
| Example 27 | 17 | 110 | good | good | good |
| Example 28 | 22 | 111 | good | good | good |
| Example 29 | 21 | 112 | good | good | good |
| Example 30 | 28 | 103 | good | good | good |
| Comparative Example 12 | 58 | 93 | good | good | good |
| Comparative Example 13 | 22 | 100 | good | good | poor |

TABLE 6-continued

|   |   |   |   |   |   |
|---|---|---|---|---|---|
| Comparative Example 14 | — | 97 | good | good | poor |
| Comparative Example 15 | 74 | 98 | good | poor | good |
| Comparative Example 16 | Interlayer separation occurred between the textured layer and the substrate layer | | | | |
| Comparative Example 17 | 90 | 92 | good | good | good |

Examples 22-30, Comparative Examples 12-17

Multilayered resin sheets according to Examples 22-30 and Comparative Examples 12-17 were prepared in the same manner as Example 21, apart from the compositions and thicknesses of the textured layer and the other layers of the multilayered resin sheet, and the electron beam irradiation conditions, which were set as shown in Table 5, and these were molded into yogurt containers.

In Comparative Example 12, no water repellent agent was added, and the edge portions of the yogurt container were thermoformed to a drawing ratio of 4 times, in Comparative Example 13, no water repellent agent was added, and the polystyrene resin in the substrate layer was 70 mass %, in Comparative Example 14, no texturing was performed, and the polystyrene resin in the substrate layer was 70 mass %, in Comparative Example 15, crosslinking by electron beam irradiation was not performed, and in Comparative Example 16, a multilayered resin sheet was formed without laminating a sealant resin layer. In Comparative Example 17, a single layer sheet of only a styrenic resin composition was used.

The following is clear from the results shown in Table 5.

In all of Examples 21-30, results satisfying all the criteria for water repellence in the case of sheets, and bump height decrease, water repellence, punchability and container strength in the case of molded articles were obtained. On the other hand, in Comparative Example 12, water repellence was not obtained at the edge portions of the yogurt container, in Comparative Example 13, some water repellence was obtained at the edge portions of the yogurt container, but the container strength was inadequate. In Comparative Example 14, water repellence was not obtained in either the sheet or the edge portions of the yogurt container, and the container strength was also inadequate. In Comparative Example 15, electron beam crosslinking was not performed and the bump height at the edge portions of the yogurt container was not maintained, so water repellence was not obtained, and resin burrs also were generated when punching out the container. In Comparative Example 16, no sealant resin layer was laminated, so interlayer separation occurred between the textured layer and the substrate layer. In Comparative Example 17, the bump height at the edge portions of the yogurt container was not maintained, so water repellence was not obtained at the edge portions of the yogurt container.

Example 31

Five 40 mm uniaxial extruders were used to obtain a multilayered resin sheet of thickness 900 μm having a layer structure consisting of a 100 μm textured layer/20 μm sealant resin layer/20 μm modified olefinic polymer resin layer A/30 μm oxygen barrier resin layer/20 μm modified olefinic polymer resin layer B/710 μm styrenic resin layer, by means of a feed block process. The textured layer was formed by a polyethylene resin composition obtained by mixing 90 mass % of a polyethylene resin and 10 mass % of a silicone-based water repellent agent (the silicone resin content being 3 mass % with respect to the total mass of the textured layer), and as the styrenic resin layer, a mix of a HIPS resin and a GPPS resin at a mass ratio of 80/20 (HIPS/GPPS) was used (butadiene rubber component content of the HIPS resin in the substrate layer: 7.2 mass %).

The multilayered resin sheet obtained as described above was hot press formed using a plate-shaped mold 260 mm on a side produced by an etching method under the below-indicated conditions, to provide a microscopic texture on the textured layer of the multilayered resin sheet.

| | |
|---|---|
| Equipment used: | Hot Press MP-WNL (Toyo Seiki) |
| Upper heating platen temperature: | 135° C. |
| Lower heating platen temperature: | 135° C. |
| Press force: | 16 MPa |

A thermoplastic resin sheet provided with a texture as obtained above was irradiated with electron beams using an electron beam irradiation device (Eye Electron Beam) under irradiation conditions according to irradiation conditions of acceleration voltage 200 kV and radiation dose 250 kGy, to perform crosslinking of the textured layer. The compositions of the respective layers, layer structure, thickness and electron beam irradiation conditions of thermoplastic resin sheets formed in this way are shown in Table 7.

The multilayered resin sheets prepared as described above were evaluated as to their various properties by the methods described above. Additionally, using the resulting resin sheets, molded articles in the form of molded yogurt containers (see FIG. 7) were produced in a vacuum/pressure former (Asano Laboratories) using a mold for yogurt containers, and the various properties of the containers were also evaluated by the methods described above. The results are shown in Table 8.

TABLE 7

| | | Textured Layer | | | | | | |
|---|---|---|---|---|---|---|---|---|
| | | (A) Polyethylene Resin | (B) Silicone Resin and Polyolefinic Resin Composition | (C) Carnauba Wax | Silicone Resin and Carnauba Wax Content (mass %) | (G) Sealant Resin Layer | (F) Modified Olefinic Polymer Resin Layer | (I) Oxygen Barrier Resin Layer |
| Example 31 | Composition (mass %) | 90 | 10 | — | 3 | 100 | 100 | 100 |
| | Layer thickness (μm) | | 100 | | | 20 | 20 | 30 |
| Example 32 | Composition (mass %) | 80 | 20 | — | 6 | 100 | 100 | 100 |
| | Layer thickness (μm) | | 100 | | | 30 | 30 | 20 |

TABLE 7-continued

| | | | | | | | | |
|---|---|---|---|---|---|---|---|---|
| Example 33 | Composition (mass %) | 70 | 30 | — | 9 | 100 | 100 | 100 |
| | Layer thickness (μm) | | 100 | | | 35 | 35 | 15 |
| Example 34 | Composition (mass %) | 80 | 20 | — | 6 | 100 | 100 | 100 |
| | Layer thickness (μm) | | 100 | | | 20 | 20 | 30 |
| Example 35 | Composition (mass %) | 80 | 20 | — | 6 | 100 | 100 | 100 |
| | Layer thickness (μm) | | 130 | | | 20 | 20 | 30 |
| Example 36 | Composition (mass %) | 80 | 20 | — | 6 | 100 | 100 | 100 |
| | Layer thickness (μm) | | 130 | | | 20 | 20 | 40 |
| Example 37 | Composition (mass %) | 80 | 20 | — | 6 | 100 | 100 | 100 |
| | Layer thickness (μm) | | 130 | | | 35 | 35 | 15 |
| Example 38 | Composition (mass %) | 75 | 25 | — | 7.5 | 100 | 100 | 100 |
| | Layer thickness (μm) | | 220 | | | 20 | 20 | 30 |
| Example 39 | Composition (mass %) | 75 | 25 | — | 7.5 | 100 | 100 | 100 |
| | Layer thickness (μm) | | 220 | | | 35 | 35 | 15 |
| Example 40 | Composition (mass %) | 95 | — | 5 | 5 | 100 | 100 | 100 |
| | Layer thickness (μm) | | 100 | | | 20 | 20 | 30 |
| Comparative Example 18 | Composition (mass %) | 100 | — | — | — | 100 | 100 | 100 |
| | Layer thickness (μm) | | 100 | | | 20 | 20 | 30 |
| Comparative Example 19 | Composition (mass %) | 90 | 10 | — | 3 | 100 | 100 | 100 |
| | Layer thickness (μm) | | 100 | | | 30 | 30 | 20 |
| Comparative Example 20 | Composition (mass %) | 90 | 10 | — | 3 | 100 | 100 | 100 |
| | Layer thickness (μm) | | 350 | | | 90 | 35 | 15 |
| Comparative Example 21 | Composition (mass %) | 80 | 20 | — | 6 | — | 100 | 100 |
| | Layer thickness (μm) | | 100 | | | — | 20 | 30 |
| Comparative Example 22 | Composition (mass %) | 80 | 20 | — | 6 | 100 | 100 | — |
| | Layer thickness (μm) | | 130 | | | 20 | 20 | — |
| Comparative Example 23 | Composition (mass %) | — | — | — | — | — | — | — |
| | Layer thickness (μm) | | — | | | — | — | — |

| | | (F) Modified Olefinic Polymer Resin Layer | Styrenic Resin Layer | | | Electron Beam Irradiation | |
|---|---|---|---|---|---|---|---|
| | | | (D) High Impact Polystyrene Resin | (H) Polystyrene Resin | Rubber Component (mass %) | Acceleration Voltage (KV) | Radiation Dose (KGy) |
| Example 31 | Composition (mass %) | 100 | 80 | 20 | 7.2 | 200 | 250 |
| | Layer thickness (μm) | 20 | 710 | | | | |
| Example 32 | Composition (mass %) | 100 | 70 | 30 | 6.3 | 200 | 250 |
| | Layer thickness (μm) | 30 | 690 | | | | |
| Example 33 | Composition (mass %) | 100 | 80 | 20 | 7.2 | 150 | 200 |
| | Layer thickness (μm) | 35 | 680 | | | | |
| Example 34 | Composition (mass %) | 100 | 65 | 35 | 5.9 | 150 | 200 |
| | Layer thickness (μm) | 20 | 710 | | | | |
| Example 35 | Composition (mass %) | 100 | 70 | 30 | 6.3 | 200 | 250 |
| | Layer thickness (μm) | 20 | 680 | | | | |
| Example 36 | Composition (mass %) | 100 | 80 | 20 | 7.2 | 150 | 200 |
| | Layer thickness (μm) | 20 | 670 | | | | |
| Example 37 | Composition (mass %) | 100 | 65 | 35 | 5.9 | 200 | 250 |
| | Layer thickness (μm) | 35 | 650 | | | | |
| Example 38 | Composition (mass %) | 100 | 80 | 20 | 7.2 | 200 | 250 |
| | Layer thickness (μm) | 20 | 590 | | | | |
| Example 39 | Composition (mass %) | 100 | 70 | 30 | 6.3 | 200 | 250 |
| | Layer thickness (μm) | 35 | 560 | | | | |
| Example 40 | Composition (mass %) | 100 | 80 | 20 | 7.2 | 150 | 200 |
| | Layer thickness (μm) | 20 | 710 | | | | |
| Comparative Example 18 | Composition (mass %) | 100 | 80 | 20 | 7.2 | 200 | 250 |
| | Layer thickness (μm) | 30 | 710 | | | | |
| Comparative Example 19 | Composition (mass %) | 100 | 30 | 70 | 2.7 | — | — |
| | Layer thickness (μm) | 30 | 690 | | | | |
| Comparative Example 20 | Composition (mass %) | 100 | 80 | 20 | 7.2 | — | — |
| | Layer thickness (μm) | 35 | 375 | | | | |
| Comparative Example 21 | Composition (mass %) | 100 | 65 | 35 | 5.9 | Interlayer separation occurred | |
| | Layer thickness (μm) | 20 | 730 | | | | |
| Comparative Example 22 | Composition (mass %) | 100 | 70 | 30 | 6.3 | 200 | 250 |
| | Layer thickness (μm) | 20 | 710 | | | | |
| Comparative Example 23 | Composition (mass %) | — | 70 | 30 | 6.3 | 200 | 250 |
| | Layer thickness (μm) | — | 900 | | | | |

TABLE 8

| | Thermoplastic Multilayered Resin Sheet Evaluation (Before Thermoforming) | | | | | | Molded Article Evaluation (After Thermoforming) | |
|---|---|---|---|---|---|---|---|---|
| | Bump Height (μm) | Bump Diameter (μm) | Bump Pitch (μm) | Bump Arrangement | Contact Angle (°) Yogurt | Oxygen Permability (ml/m² · day · atm) | Drawing Ratio (%) | Bump Height (μm) |
| Example 31 | 85 | 160 | 27 | staggered | 123 | 0.21 | 1.8 | 72 |
| Example 32 | 85 | 160 | 27 | staggered | 122 | 0.25 | 1.9 | 70 |
| Example 33 | 85 | 160 | 27 | staggered | 120 | 0.29 | 2.1 | 65 |
| Example 34 | 85 | 160 | 27 | grid | 125 | 0.15 | 2.3 | 61 |
| Example 35 | 95 | 180 | 40 | staggered | 129 | 0.23 | 1.7 | 81 |
| Example 36 | 95 | 180 | 40 | staggered | 126 | 0.28 | 2.0 | 79 |
| Example 37 | 95 | 180 | 40 | grid | 127 | 0.16 | 1.7 | 80 |
| Example 38 | 200 | 450 | 20 | grid | 129 | 0.2 | 1.7 | 158 |
| Example 39 | 200 | 450 | 20 | grid | 130 | 0.24 | 1.8 | 160 |
| Example 40 | 85 | 160 | 56 | staggered | 120 | 0.2 | 2.5 | 60 |
| Comparative Example 18 | 85 | 160 | 56 | grid | 113 | 0.25 | 4.0 | 37 |
| Comparative Example 19 | untreated | | | — | 99 | 0.2 | 1.8 | — |
| Comparative Example 20 | 85 | 160 | 56 | staggered | 121 | 0.11 | 1.8 | 23 |
| Comparative Example 21 | Interlayer separation occurred between the textured layer and the substrate layer | | | | | | | |
| Comparative Example 22 | 30 | 150 | 40 | grid | 115 | 120 | 1.7 | 20 |
| Comparative Example 23 | 85 | 160 | 56 | staggered | 116 | 145 | 1.8 | 7 |

| | Molded Article Evaluation (After Thermoforming) | | | | |
|---|---|---|---|---|---|
| | Decrease (%) | Contact Angle (°) Yogurt | Moldability | Punchability | Container Strength |
| Example 31 | 15 | 116 | good | good | good |
| Example 32 | 18 | 114 | good | good | good |
| Example 33 | 24 | 113 | good | good | good |
| Example 34 | 28 | 109 | good | good | good |
| Example 35 | 15 | 115 | good | good | good |
| Example 36 | 17 | 111 | good | good | good |
| Example 37 | 16 | 110 | good | good | good |
| Example 38 | 21 | 111 | good | good | good |
| Example 39 | 20 | 111 | good | good | good |
| Example 40 | 29 | 103 | good | good | good |
| Comparative Example 18 | 56 | 93 | good | good | good |
| Comparative Example 19 | — | 97 | good | good | poor |
| Comparative Example 20 | 73 | 98 | good | poor | good |
| Comparative Example 21 | Interlayer separation occurred between the textured layer and the substrate layer | | | | |
| Comparative Example 22 | 33 | 98 | good | good | good |
| Comparative Example 23 | 91 | 92 | good | good | good |

Examples 32-40, Comparative Examples 18-23

Multilayered resin sheets according to Examples 32-40 and Comparative Examples 18-23 were prepared in the same manner as Example 31, apart from the compositions and thicknesses of the textured layer and the other layers of the multilayered resin sheet, and the electron beam irradiation conditions, which were set as shown in Table 5, and these were molded into yogurt containers.

In Comparative Example 18, no water repellent agent was added, and the edge portions of the yogurt container were thermoformed to a drawing ratio of 4 times, in Comparative Example 19, no texture was provided, in Comparative Example 20, crosslinking by electron beam irradiation was not performed, and in Comparative Example 21, the multilayered resin sheet was formed without laminating a sealant resin layer. In Comparative Example 22, no oxygen barrier resin layer was laminated, and the bump height was low, and in Comparative Example 23, a single layer sheet of only a styrenic resin composition was used.

The following is clear from the results shown in Table 8.

In all of Examples 31-40, results satisfying all the criteria for water repellence and oxygen barrier ability in the case of sheets, and bump height decrease, water repellence, punchability and container strength in the case of molded articles were obtained. On the other hand, in Comparative Example 18, water repellence was not obtained at the edge portions of the yogurt container, in Comparative Example 19, water repellence was not obtained in either the sheet or the edge portions of the yogurt container, and the container strength was also inadequate. In Comparative Example 20, the bump height at the edge portions of the yogurt container was not maintained, so water repellence was not obtained, and resin burrs also were generated when punching out the container. In Comparative Example 21, no sealant resin layer was laminated, so interlayer separation occurred between the textured layer and the modified olefinic polymer resin layer. In Comparative Example 22, the oxygen permeability was extremely high, and water repellence was not obtained at the edge portions of the yogurt container. In Comparative Example 23, the bump height at the edge portions of the yogurt container was not maintained, so water repellence was not obtained at the edge portions of the yogurt container, and the oxygen permeability was extremely high.

While the present invention has been described using various embodiments above, the fact that the technical scope of the present invention is not limited to the scope described in the above embodiments need not be mentioned. The fact that various modifications or improvements could be made to the above-described embodiments would be clear to a person skilled in the art. Additionally, the fact that embodiments including such modifications or improvements may also lie within the technical scope of the present invention is clear from the recitations of the claims.

DESCRIPTION OF REFERENCE NUMBERS 1 textured layer
2a, 2b styrenic resin layer
3 sealant resin layer
4 oxygen barrier resin layer
5 sealant resin layer
6a, 6b modified olefinic polymer resin layer
h bump height
d bump diameter
t bump pitch

The invention claimed is:

1. A thermoplastic resin sheet having water repellence, comprising a textured layer formed from a polyethylene resin composition comprising a water repellent agent, having a microscopic texture on one surface side, wherein
at least a surface portion of the texture is a crosslinked material that maintains the microscopic texture even after heated drawing, and
the microscopic texture has bumps with bump heights of 70 to 200 µm.

2. The thermoplastic resin sheet according to claim 1, wherein a styrenic resin layer is laminated on the other surface of the textured layer.

3. The thermoplastic resin sheet according to claim 2, wherein a sealant resin layer is formed between the textured layer and the styrenic resin layer.

4. The thermoplastic resin sheet according to claim 1 wherein, on the other surface side of the textured layer, an oxygen barrier resin layer is laminated with one surface on the textured layer side such that, sequentially from the textured layer side, a sealant resin layer and a modified olefinic polymer resin layer are interposed therebetween, and on the other surface of the oxygen barrier resin layer, a styrenic resin layer is laminated such that a modified olefinic polymer resin layer is interposed therebetween.

5. The thermoplastic resin sheet according to claim 1, wherein at least a surface portion on the one surface side of the textured layer is an electron beam-crosslinked material.

6. The thermoplastic resin sheet according to claim 1, wherein the water repellent agent is a silicone-based water repellent agent and/or carnauba wax.

7. The thermoplastic resin sheet according to claim 1, wherein the microscopic texture has bumps that are bell-shaped, with bump diameters of 80 to 500 µm and a bump pitch of 15 µm to 70 µm.

8. The thermoplastic resin sheet according to claim 1, wherein the thermoplastic multilayered resin sheet has a drawing ratio for heated drawing of 0.05 to 2.5 times, and a rate of decrease of bump height of the textured layer before and after heated drawing is 30% or less.

9. The thermoplastic multilayered resin sheet according to claim 2, wherein the styrenic resin layer is formed from a composition comprising, as a resin component, 10 to 50 mass % of a polystyrene resin and 90 to 50 mass % of a high-impact polystyrene resin, and further comprising 4.5 to 8.1 parts by mass of a rubber component with respect to 100 parts by mass of the resin component.

10. The thermoplastic multilayered resin sheet according to claim 3 wherein the sealant resin layer is formed from a resin composition comprising 90 to 95 mass % of a styrenic resin and 5 to 10 mass % of a hydrogenated styrenic thermoplastic elastomer, or 100 mass % of a hydrogenated styrenic thermoplastic elastomer, or 100 mass % of a modified olefinic polymer resin.

11. The thermoplastic multilayered resin sheet according to claim 4, wherein the oxygen barrier resin layer comprises an ethylene-vinyl alcohol copolymer resin.

12. A molded article formed by thermoforming the thermoplastic multilayered resin sheet according to claim 1.

13. The molded article according to claim 12 which is a molded container.

14. The molded article according to claim 13 which is a container adapted for containing a food product.

15. The molded article according to claim 14 which is a container adapted for containing yogurt.

16. The thermoplastic resin sheet according to claim 1, wherein
the water repellent agent is a silicone-based water repellent agent comprising a composition comprising a silicone resin and a higher fatty acid amide and/or carnauba wax;
the silicone resin content with respect to the total mass of the polyethylene resin composition and the silicone-based water repellent agent is 2 to 10 mass %;
the content of carnauba wax with respect to the total mass of the polyethylene resin composition and the silicone-based water repellent agent is 3 to 10 mass %;
the polyethylene resin composition comprises linear low-density polyethylenes and/or linear medium-density polyethylenes;
at least a surface portion on the one surface side of the textured layer is an electron beam-crosslinked material formed by electron beam irradiation at an acceleration voltage of 110 to 250 kV and a radiation dose of 150 to 300 kGy;
the microscopic texture has bumps that are bell-shaped, with bump diameters of 80 to 500 µm and a bump pitch of 15 µm to 70 µm;
a thickness of the thermoplastic resin sheet is 500 µm to 1200 µm; and
the bumps are arranged in a grid arrangement positioned in columns and rows, or in a staggered arrangement.

* * * * *